(12) United States Patent
Islam et al.

(10) Patent No.: US 10,595,342 B2
(45) Date of Patent: Mar. 17, 2020

(54) SIMULTANEOUS RECEPTION SWEEP AND TRANSMISSION IN A FULL-DUPLEX NODE

(71) Applicant: QUALCOMM Incorporated, San Diego, CA (US)

(72) Inventors: Muhammad Nazmul Islam, Edison, NJ (US); Junyi Li, Chester, NJ (US); Sundar Subramanian, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 15/949,945

(22) Filed: Apr. 10, 2018

(65) Prior Publication Data

US 2018/0317259 A1 Nov. 1, 2018

Related U.S. Application Data

(60) Provisional application No. 62/492,788, filed on May 1, 2017.

(51) Int. Cl.
*H04W 74/08* (2009.01)

(52) U.S. Cl.
CPC .............. *H04W 74/0816* (2013.01)

(58) Field of Classification Search
CPC ................................. H04W 74/0816
See application file for complete search history.

(56) References Cited

U.S. PATENT DOCUMENTS

| 9,590,772 B2 | 3/2017 | Choi et al. |
| 2014/0355491 A1 | 12/2014 | Khidre et al. |
| 2016/0277976 A1* | 9/2016 | Takahashi ......... H04W 36/0027 |
| 2016/0380354 A1* | 12/2016 | Bozier ................... F16M 11/06 |
| | | 455/562.1 |
| 2017/0170999 A1 | 6/2017 | Zhou et al. |
| 2017/0176573 A1 | 6/2017 | Lynch |
| 2017/0207532 A1 | 7/2017 | Wang |

* cited by examiner

*Primary Examiner* — Duc C Ho
(74) *Attorney, Agent, or Firm* — Holland & Hart LLP

(57) ABSTRACT

Methods, systems, and devices for wireless communication are described. A wireless node may transmit directional signals in a sweeping transmission pattern while receiving communications from a second wireless node. Another wireless node may then, during a listen-before-talk (LBT) procedure, receive one of the directional signals, and terminate a correspondence communication session to avoid potential interference. Additionally or alternatively, a wireless node may listen in directions in a sweeping receive pattern while transmitting to a second wireless node. While listening, the wireless node may detect a transmission from a third wireless node in a particular direction. The wireless node may then accordingly refrain from transmitting in that direction to avoid potential interference.

30 Claims, 16 Drawing Sheets

SIMULTANEOUS RECEPTION SWEEP AND TRANSMISSION IN A FULL-DUPLEX NODE

CROSS REFERENCES

The present Application for Patent claims priority to U.S. Provisional Patent Application No. 62/492,788 by Islam, et al., entitled "Simultaneous Reception Sweep and Transmission in a Full Duplex Node," filed May 1, 2017, assigned to the assignee hereof, and is hereby expressly incorporated by reference.

BACKGROUND

The following relates generally to wireless communication, and more specifically to transmission and reception sweeping in a full-duplex node.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems, beamforming may be used to increase the strength of wireless signals, including signals that are sent between wireless nodes (e.g., UEs, base stations, access network nodes, and the like). In such cases, different wireless nodes may send and receive transmissions in directions corresponding to the respective locations of each wireless node. However, directional transmissions from one node may not be known by a neighboring node, and transmissions by different nodes in a similar direction may interfere with each other. Techniques may accordingly be desired to enable coherent communications by all wireless nodes in a system while reducing interference between the wireless nodes.

SUMMARY

The described techniques relate to improved methods, systems, devices, or apparatuses that support transmission and reception sweeping in a full-duplex node. For example, the described techniques provide for a wireless node (e.g., user equipments (UEs), base stations, or access network nodes) transmitting directional signals in a sweeping transmission pattern while simultaneously receiving communications from a second wireless node. Another wireless node may then, during a listen-before-talk (LBT) procedure, receive one of the directional signals, and accordingly terminate a communication session to avoid potential interference. Additionally or alternatively, a wireless node may listen in different directions according to a sweeping receive pattern while transmitting to a second wireless node. While listening, the wireless node may detect a transmission from another wireless node in a particular direction that may potentially cause interference. The wireless node may then accordingly refrain from transmitting in that direction to avoid potential interference A method of wireless communication is described. The method may include selecting a plurality of reception directions for a sweeping receive pattern based on prior signaling transmitted by the one or more additional wireless nodes, transmitting a first message to a second wireless node and listening, while concurrently transmitting the first message and in accordance with the sweeping receive pattern, for one or more signals from one or more additional wireless nodes in a corresponding direction.

An apparatus for wireless communication is described. The apparatus may include means for selecting a plurality of reception directions for a sweeping receive pattern based on prior signaling transmitted by the one or more additional wireless nodes, transmitting a first message to a second wireless node and means for listening, while concurrently transmitting the first message and in accordance with the sweeping receive pattern, for one or more signals from one or more additional wireless nodes in a corresponding direction.

Another apparatus for wireless communication is described. The apparatus may include a processor, memory in electronic communication with the processor, and instructions stored in the memory. The instructions may be operable to cause the processor to select a plurality of reception directions for a sweeping receive pattern based on prior signaling transmitted by the one or more additional wireless nodes, transmit a first message to a second wireless node and listen, while concurrently transmitting the first message and in accordance with a sweeping receive pattern, for one or more signals from one or more additional wireless nodes in a corresponding direction.

A non-transitory computer readable medium for wireless communication is described. The non-transitory computer-readable medium may include instructions operable to cause a processor to select a plurality of reception directions for a sweeping receive pattern based on prior signaling transmitted by the one or more additional wireless nodes, transmit a first message to a second wireless node and listen, while concurrently transmitting the first message and in accordance with the sweeping receive pattern, for one or more signals from one or more additional wireless nodes in a corresponding direction.

In some examples of the method, apparatus, and non-transitory computer-readable medium described above, the first wireless node supports full-duplex communications. In some examples of the method, apparatus, and non-transitory computer-readable medium described above, the first wireless node transmits the first message and receives the one or more signals in a same radio frequency band. In some examples of the method, apparatus, and non-transitory computer-readable medium described above, listening for the one or more signals comprises: listening for one or more request-to-send (RTS) and clear-to-send (CTS) signals from the one or more additional wireless nodes.

Some examples of the method, apparatus, and non-transitory computer-readable medium described above may further include processes, features, means, or instructions for determining that a request-to-send (RTS) or clear-to-send (CTS) may be being transmitted by at least one of the one or more additional wireless nodes. Some examples of the method, apparatus, and non-transitory computer-readable medium described above may further include processes, features, means, or instructions for refraining from transmitting a second message in a direction corresponding to the at least one of the one or more additional wireless nodes based at least in part on the determination.

Some examples of the method, apparatus, and non-transitory computer-readable medium described above may further include processes, features, means, or instructions for determining respective locations of the one or more additional wireless nodes based on the prior signaling. Some examples of the method, apparatus, and non-transitory computer-readable medium described above may further include processes, features, means, or instructions for receiving an indication of respective locations of the one or more additional wireless nodes, wherein selecting the plurality of reception directions may be based at least in part on the indication.

In some examples of the method, apparatus, and non-transitory computer-readable medium described above, listening for the one or more signals comprises: listening in a plurality of reception directions during respective time intervals. Some examples of the method, apparatus, and non-transitory computer-readable medium described above may further include processes, features, means, or instructions for receiving the one or more signals during the respective time intervals. Some examples of the method, apparatus, and non-transitory computer-readable medium described above may further include processes, features, means, or instructions for receiving, from the one or more additional wireless nodes, an indication of a transmission configuration indicator (TCI) for at least one reference signal transmitted by the one or more additional wireless nodes, where selecting a plurality of reception directions is based at least in part on the indication.

Some examples of the method, apparatus, and non-transitory computer-readable medium described above may further include processes, features, means, or instructions for receiving, prior to listening for the one or more signals from the one or more additional wireless nodes, a sequence or a message transmitted by the one or more additional wireless nodes. In some examples of the method, apparatus, and non-transitory computer-readable medium described above, the sequence or the message conveys at least a cell identity of the one or more additional wireless nodes, a timing reference of the one or more additional wireless nodes, any combination thereof.

In some examples of the method, apparatus, and non-transitory computer-readable medium described above, the sweeping receive pattern comprises a plurality of receive directions having a predefined angular separation between each of the plurality of receive directions. In some examples of the method, apparatus, and non-transitory computer-readable medium described above, the plurality of receive directions may be different than a direction corresponding to transmission of the first message to the second wireless node.

DETAILED DESCRIPTION

Figure 1:
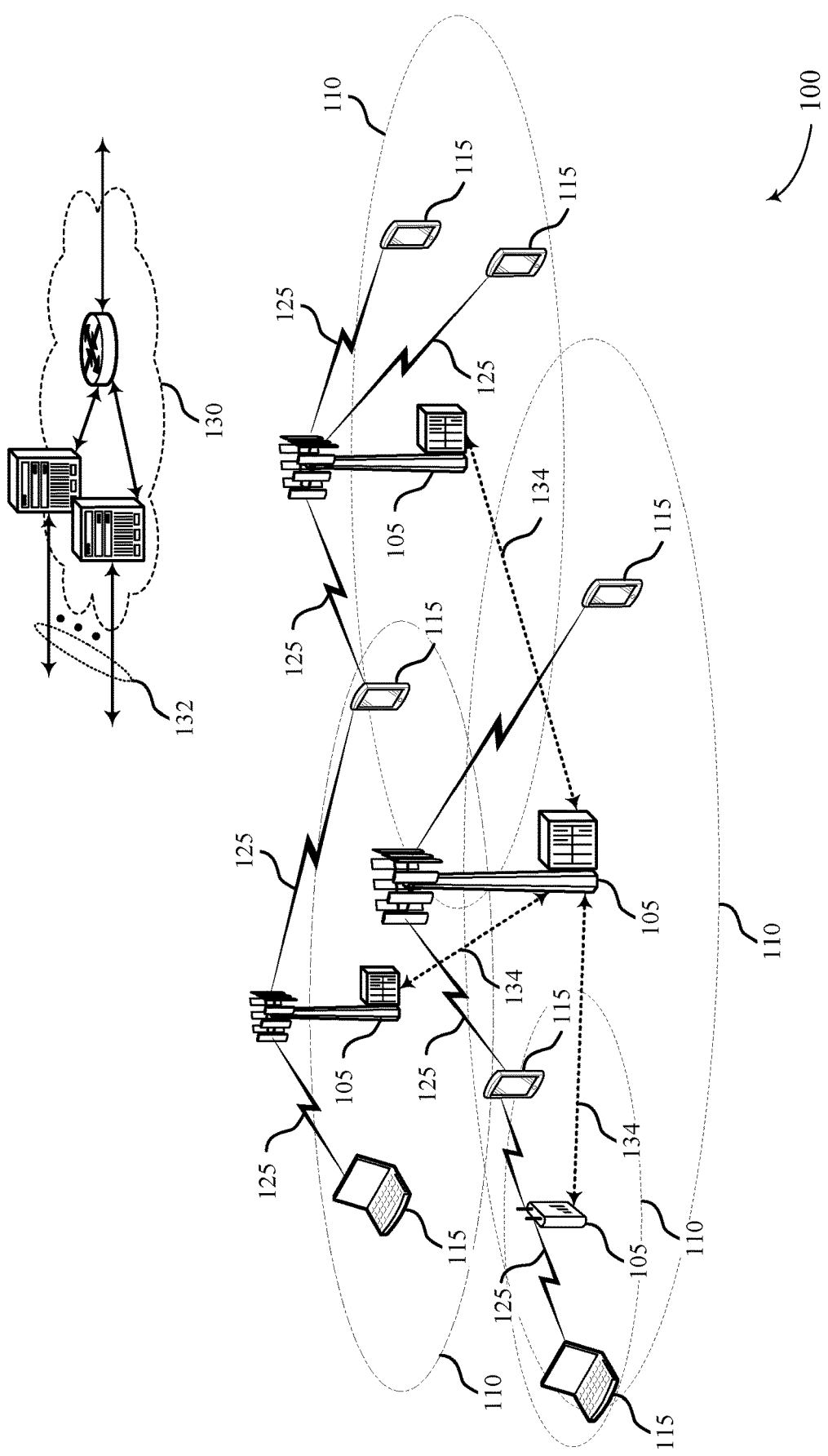
FIG. 1 illustrates an example of a system for wireless communication in accordance with aspects of the present disclosure.

Some wireless communication systems may operate in millimeter wave (mmW) frequency ranges, e.g., from 25 gigahertz (GHz) to 300 GHz. Wireless communication at these frequencies may be associated with increased signal attenuation (e.g., path loss), which may be influenced by various factors, such as temperature, barometric pressure, diffraction, etc. Accordingly, transmissions in these frequency ranges may be impeded by physical obstructions, such as walls within a building. As a result, signal processing techniques, such as beamforming, may be used to coherently combine energy and overcome the path losses at these frequencies.

A wireless communications system may include several wireless nodes (e.g., a user equipment (UE), a base station, access network nodes, etc.). These wireless nodes may communicate with each other by sending and receiving beamformed transmissions in directions corresponding to the respective locations of each wireless node. In some cases, transmissions between wireless nodes in the wireless communications system may cause interference in nearby transmissions between other wireless nodes. For example, due to distance or physical barriers between different devices, a first wireless node, while communicating, may not be aware that a neighboring node is also transmitting or attempting to communicate, and the first wireless node may inadvertently cause interference when transmitting in the direction of the neighboring node. A wireless node in such a system may accordingly experience "deafness," where a first wireless node is unaware of surrounding transmissions while it is also transmitting.

To enable efficient communications and avoid interference between nodes, a full-duplex node (e.g., a wireless device that is capable of simultaneous transmission and reception) may use various techniques to avoid interference with other devices. For instance, a wireless node may, while receiving an incoming signal, broadcast transmissions in a sweeping manner (e.g., in accordance with a sweeping transmission pattern) to alert a would-be conflicting wireless node of the potential interference. In some cases, the signals that are transmitted in a sweeping pattern may include a message or a sequence that is used by neighboring nodes to identify the transmitting node, timing information associated with the transmitting node, or the duration of a communications session. Additionally or alternatively, the wireless node may, while transmitting, listen in various directions in a sweeping manner (e.g., in accordance with a sweeping receive pattern) to itself detect potential interference. The transmission and reception patterns may include any type of pattern when a wireless node transmits or receives in a set of different directions or angles. For instance, the wireless node may sweep through a plurality of directions over 360 degrees, or may sweep in a coherent manner based on the location of one or more additional wireless nodes, or any combination of these techniques.

Aspects of the disclosure are initially described in the context of a wireless communications system. Examples are also provided that illustrate process flows in systems that support sweeping transmission directions while receiving, and sweeping receive directions while transmitting. Aspects of the disclosure are further illustrated by and described with reference to apparatus diagrams, system diagrams, and flowcharts that relate to transmission and reception sweeping in a full-duplex node.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. In some examples, a wireless node (e.g., a UE 115, a base station 105, or an access network node) may implement a procedure to broadcast transmissions, while simultaneously receiving, in a sweeping manner to alert other wireless nodes of potential interference. In some examples, the wireless node may implement a procedure to listen in directions in a sweeping manner while simultaneously transmitting so that it may detect potential interference from other wireless nodes. Thus, the methods described herein may provide for avoiding deafness at a wireless node caused by transmission interference.

The wireless nodes in wireless communications system 100 may also be examples of an access point (AP) or a station in a wireless local area network (WLAN) (also known as a Wi-Fi network). An AP and associated stations may represent a basic service set (BSS) or an extended service set (ESS), and may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 megahertz (MHz) band. The unlicensed spectrum may also include other frequency bands, such as shared licensed frequency bands, where multiple operators may have a license to operate in the same or overlapping frequency band or bands. In such cases, the wireless nodes may communicate with one another according to the WLAN radio and baseband protocol for physical (PHY) and medium access control (MAC) layers from Institute of Electrical and Electronics Engineers (IEEE) 802.11 and versions including, but not limited to, 802.11b, 802.11g, 802.11a, 802.11n, 802.11ac, 802.11ad, 802.11ah, 802.11ax, 802.11az, 802.11ba, etc.

Some wireless nodes may be capable of transmitting and receiving at the same time. That is, communications signals may be transmitted in two directions (e.g., between two devices) on a carrier at the same time. Such communication may be referred to full-duplex communications and, in such cases, the wireless nodes may use different radio frequency chains to simultaneously transmit and receive signals. Accordingly, the simultaneous transmission and reception may be performed in a same radio frequency band or in different bands.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, S2, etc.). Base stations 105 may communicate with one another over backhaul links 134 (e.g., X1, X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a WLAN) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 25 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. A receiving device may similarly listen in a particular direction to receive a directional transmission, were a receive beam is formed through beamforming techniques at an antenna array.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a network device, or core network 130 supporting radio bearers for user plane data. At the PHY layer, transport channels may be mapped to physical channels.

A resource element may consist of one symbol period and one subcarrier (e.g., a 15 kilohertz (kHz) frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds (μs)). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

In wireless communications system 100, deafness issues may result from interference in transmissions between respective wireless nodes. That is, a first wireless node may not be aware of other nearby wireless nodes that are also transmitting (e.g., due to a distance between the different nodes, or due to a physical obstruction, such as a wall, foliage, or other physical barriers which may restrict signal propagation). In such cases, transmissions between some wireless nodes other may interfere with transmissions between the other nearby nodes. A full-duplex node (i.e., a wireless node operating according to a full-duplex mode) may, however, avoid such deafness by using techniques for simultaneous transmitting and receiving. The techniques described herein may be used to avoid interference in transmissions between full-duplex nodes, for example, in a network that supports beamformed transmissions.

In some cases, the described techniques provide for a wireless node (e.g., UEs 115, base stations 105, or access network nodes) transmitting directional signals in a sweeping transmission pattern while simultaneously receiving communications from a second wireless node. Another wireless node may then, during an LBT procedure, receive one of the directional signals, and accordingly terminate a communication session to avoid potential interference. Additionally or alternatively, a wireless node may listen in directions according to a sweeping receive pattern while transmitting to a second wireless node. While listening, the wireless node may detect a transmission from another wireless node in a particular direction that may potentially cause interference. The wireless node may then accordingly refrain from transmitting in that direction to avoid potential interference.

Figure 2A:
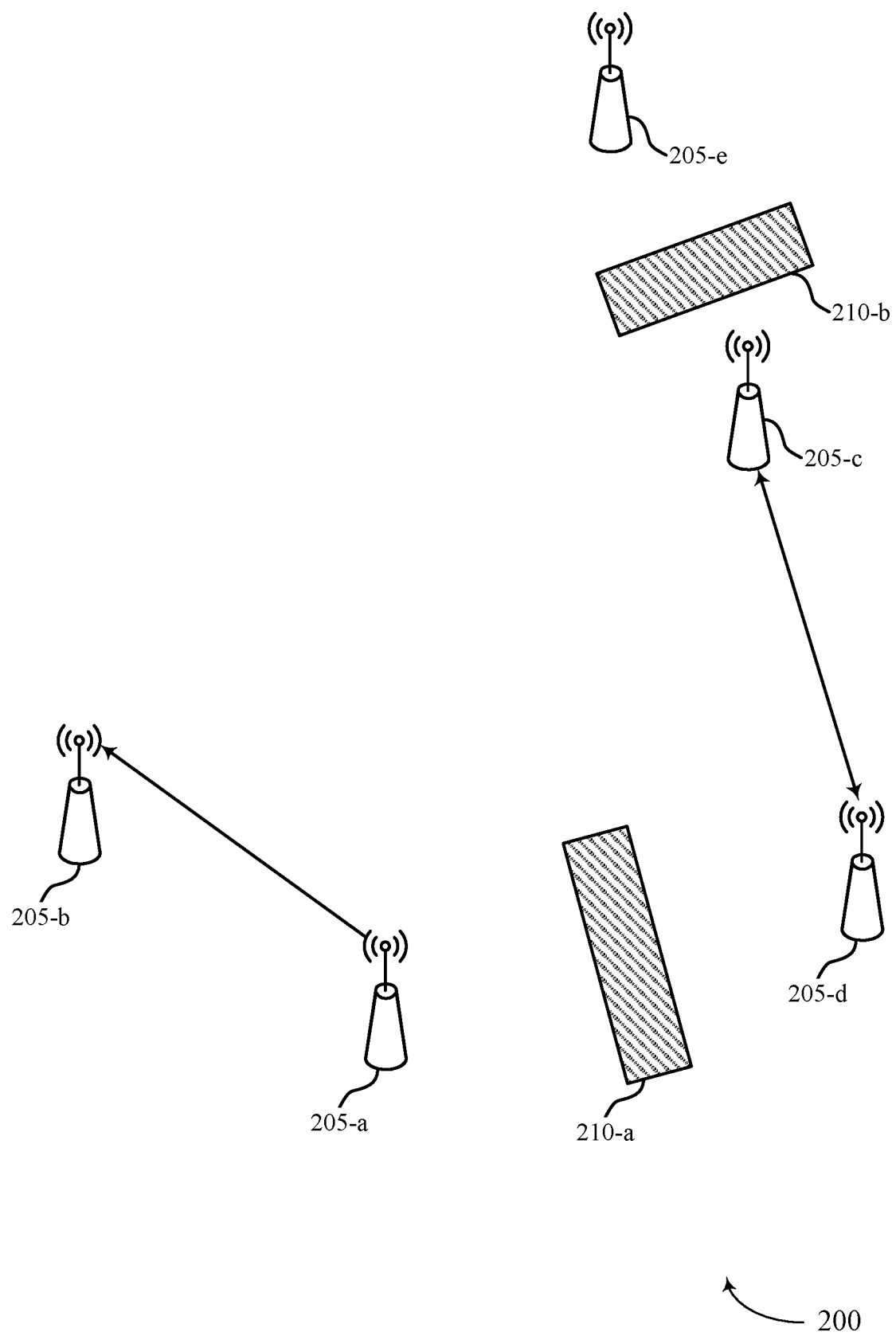
FIGS. 2A and 2B illustrate examples of a wireless communications system in accordance with aspects of the present disclosure.
Figure 2B:
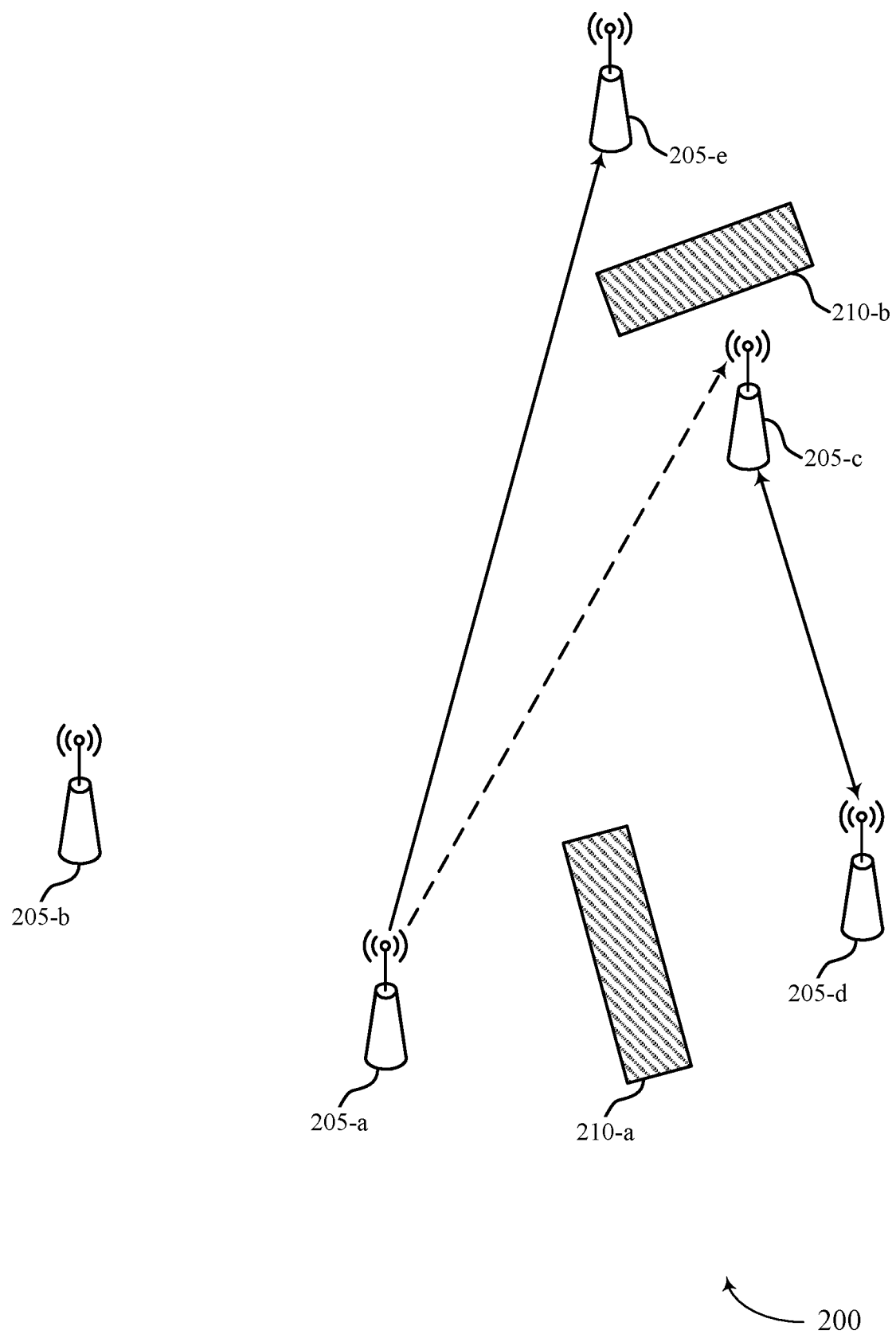

FIGS. 2A and 2B illustrate an example of a wireless communications system 200 in accordance with various aspects of the present disclosure. In some examples, wireless communications system 200 may implement aspects of wireless communications system 100. Wireless communications system 200 may include multiple wireless nodes 205, for example, a first wireless node 205-a, a second wireless node 205-b, a third wireless node 205-c, and so forth. Each wireless node 205 may be, for example, a UE 115, a base station 105, a mobile station, a mobile terminal, an AP, or another wireless communications device.

In some cases, transmissions between wireless nodes 205 may cause interference in nearby transmissions between other wireless nodes 205. For example, wireless node 205-a may send transmissions to wireless node 205-b. Meanwhile, wireless node 205-c and wireless node 205-d may prepare to begin sending and receiving transmissions between themselves. For example, wireless node 205-d may be the intended transmitter and wireless node 205-c may be the intended receiver. In some cases, wireless node 205-c and wireless node 205-d may first perform an LBT procedure. Wireless node 205-d may then transmit to wireless node 205-c a request-to-send (RTS) message. If wireless node 205-c successfully receives the RTS message, wireless node 205-c may, in response, transmit a clear-to-send (CTS) message to wireless node 205-d.

At this time, wireless node 205-c may not hear or be aware of the transmissions from wireless node 205-a to wireless node 205-b because, for example, wireless node 205-c may be a certain distance away from wireless node 205-a (e.g., such that wireless node 205-c is not aware of the ongoing communications between wireless node 205-a and wireless node 202-b). Additionally or alternatively, the direction of transmission from wireless node 205-a to wireless node 205-b may be different from the direction of transmissions from wireless node 205-*d* to wireless node 205-*c* (e.g., where the wireless nodes 205-*c*, 205-*d* may not detect directional transmissions from wireless node 205-*a* unless listening in the particular direction wireless node 205-*a* is transmitting in). Further, wireless node 205-*d* may not hear or be aware of transmissions from wireless node 205-*a*, for example, due to wall 210-*a* between them. Wall 210-*a* may be, for example, a physical wall or barrier having properties such that a wireless signal (e.g., in mmW frequency ranges) cannot penetrate wall 210-*a*.

In some examples, wireless node 205-*d* may have established communication with wireless node 205-*c*. That is, wireless node 205-*d* and wireless node 205-*c* may be respectively sending and receiving transmissions. The transmissions between wireless node 205-*d* and wireless node 205-*c* may not interfere with the transmissions from wireless node 205-*a* to wireless node 205-*b*, because, as described above, the transmission directions may not be the same.

As illustrated in FIG. 2B, at a later time, wireless node 205-*a* may stop communications with wireless node 205-*b* and may begin transmitting to wireless node 205-*e*. As described above with reference to wireless node 205-*d* and wireless node 205-*c*, wireless node 205-*a* and wireless node 205-*e* may, in some cases, perform an LBT procedure. Accordingly, wireless node 205-*a* may transmit an RTS message to wireless node 205-*e*, to which wireless node 205-*e* may respond by transmitting a corresponding CTS message to wireless node 205-*a*. In this case, wireless node 205-*a* may not hear of or be aware of the ongoing transmissions from wireless node 205-*d* to wireless node 205-*c*, for example, because of wall 210-*a* between wireless node 205-*a* and wireless node 205-*d*.

Wireless node 205-*e* may also not hear or be aware of transmissions from wireless node 205-*d* to wireless node 205-*c*, for example, because of wall 210-*b* between wireless node 205-*c* and wireless node 205-*e*. In some cases, wireless node 205-*e* may also not be aware of communications between wireless node 205-*c* and wireless node 205-*d* as it may be too far away to detect any signals sent by wireless node 205-*d*. Thus, wireless node 205-*a* may be transmitting to wireless node 205-*e* while, for example, wireless node 205-*d* is communicating with wireless node 205-*c*. These devices may experience "deafness," where various nodes may not be aware that surrounding nodes are also communicating (or attempting to communicate). In this case, wireless node 205-*c* may experience interference from transmissions by wireless node 205-*a* to wireless node 205-*e*. That is, transmissions from wireless node 205-*a* to wireless node 205-*e* may interfere with transmissions from wireless node 205-*d* to wireless node 205-*c*.

As described herein, interference caused by a wireless node 205 that is unaware of another transmitting wireless node 205 may be avoided through various techniques implemented by full-duplex wireless nodes 205. For instance, a wireless node 205 may be capable of full-duplex communications, and may communicate with another wireless node 205 while simultaneously transmitting signals in a sweeping transmission pattern, or while simultaneously receiving in a sweeping receive pattern. Transmitting signals in accordance with the sweeping transmission pattern may enable neighboring wireless nodes 205 to be aware of the communications, and may likewise enable awareness in surrounding wireless nodes 205 as to ongoing communications. Alternatively, listening for signals in accordance with the sweeping receive pattern may help a wireless node 205 to identify when other wireless nodes 205 are initiating communications sessions. The respective transmission sweeping and reception sweeping schemes described herein may each provide wireless nodes 205 with a mechanism to avoid interference in wireless communications system 200, although these schemes may also be optionally combined.

Figure 3:
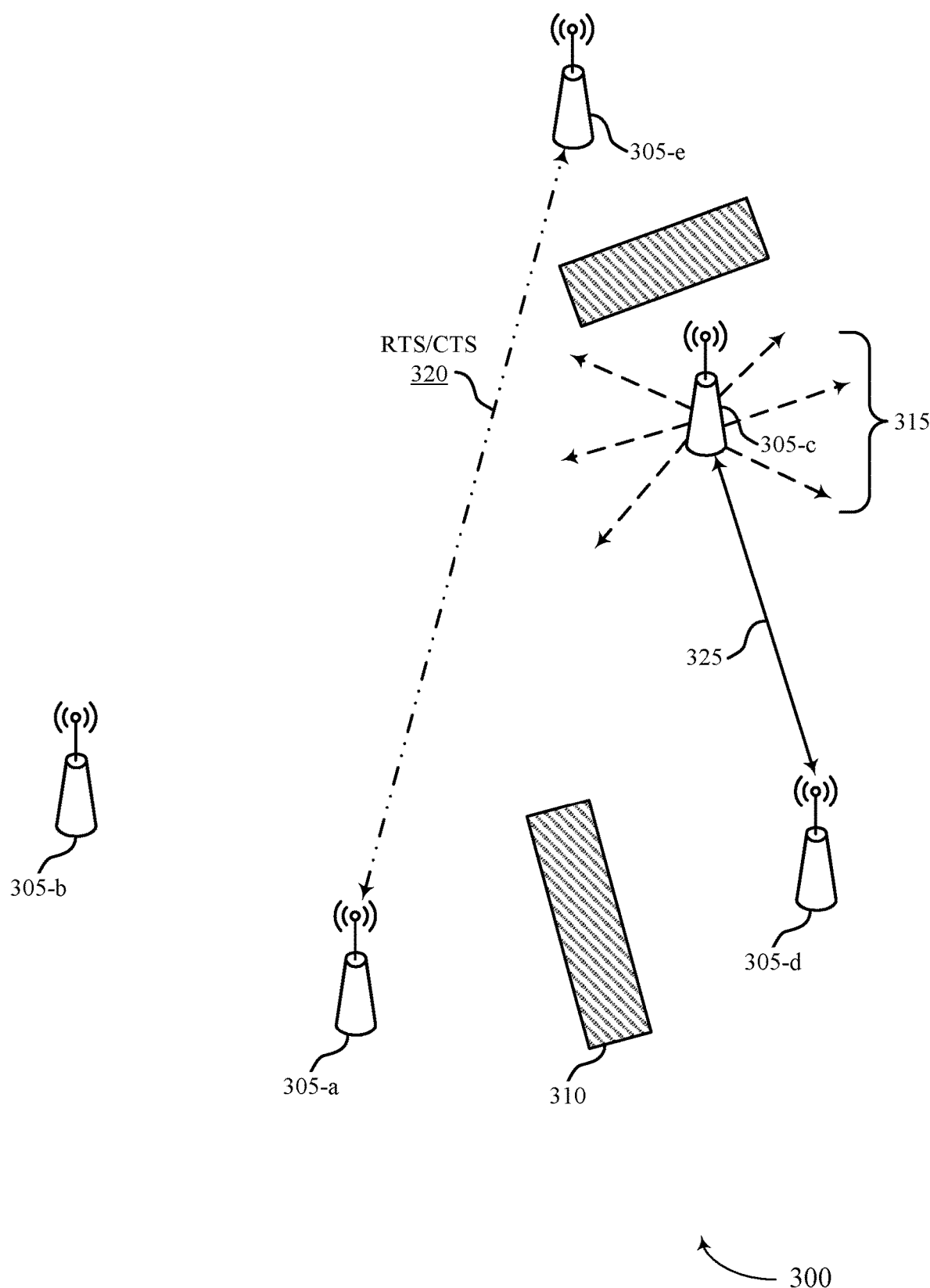
FIGS. 3 and 4 illustrate examples of wireless communications systems in accordance with aspects of the present disclosure.

FIG. 3 illustrates an example of a wireless communications system 300 in accordance with various aspects of the present disclosure. In some examples, wireless communications system 300 may implement aspects of wireless communications system 100. Wireless communications system 300 may include any number of wireless nodes 305 (e.g., first wireless node 305-*a* through fifth wireless node 305-*e*). Each wireless node 305 may be, for example, a UE 115, a base station 105, a mobile station, a mobile terminal, or another wireless communications device. The wireless nodes 305 may be corresponding examples of the wireless nodes 205 as described with reference to FIG. 2. Wireless communications system 300 may illustrate aspects of simultaneous transmission sweep and reception.

In wireless communications system 300, wireless nodes 305 may communicate with one another (e.g., as described with reference to wireless nodes 205-*c* and 205-*d* of FIG. 2). Additionally, wireless node 305-*a* may communicate with wireless node 305-*b*, and may not be aware of communications between wireless node 305-*c* and wireless node 305-*d* (e.g., due to a physical barrier blocking signals, such as wall 310). Following a communications session with wireless node 305-*b*, wireless node 305-*a* may initialize another communications session with wireless node 305-*e* by performing an LBT process (e.g., including the transmission of RTS/CTS 320 to wireless node 305-*e*).

In some cases, wireless node 305-*c* may support full-duplex communications and, while receiving an incoming transmission 325, simultaneously broadcast signals in all directions to alert a would-be conflicting wireless node 305 of the potential interference. For example, wireless node 305-*c* may, while receiving transmission 325 from wireless node 305-*d*, transmit directional signals 315 in a sweeping manner (e.g., in accordance with a sweeping pattern) in all directions. That is, the reception of the transmission 325 from wireless node 305-*d* may be received simultaneous to transmitting directional signals 315. Alternatively, wireless node 305-*c* may receive transmission 325 from wireless node 305-*d*, and then sweep directional signals 315, or vice versa. In any event, wireless node 305-*a* may detect at least one of directional signals 315 sent in the direction of wireless node 305-*a* during the transmission of RTS/CTS 320. Based on receiving one or more directional signals 315 from wireless node 305-*c*, wireless node 305-*a* may refrain from transmitting to wireless node 305-*e*, so as to avoid potential interference at wireless node 305-*c*.

Transmitting directional signals 315 in accordance with a sweeping pattern may include transmission through a plurality of different angles or directions by wireless node 305-*c*. For instance, wireless node 305-*c* may transmit directional signals 315 through a full 360 degree sweep (e.g., different directions at different times) to ensure that all surrounding wireless nodes 305 receive the directional signals 315. Additionally or alternatively, wireless node 305-*c* may coherently transmit towards locations that correspond to other wireless nodes 305 whose locations may be known, or may be determined by wireless node 305-*c* (e.g., from prior transmissions from those nodes). Further, wireless node 305-*c* may also sweep in non-planar directions, which may account for a difference in elevation for different wireless nodes 305. As an example, wireless node 305-*c* may transmit in directions relatively higher or lower in elevation than wireless node 305-*c* to ensure directional signals 315 are received by wireless nodes 305 that are elevated or depressed with relation to wireless node 305-*c*. Other types of directional patterns or sequences of directional transmissions may be possible even if not explicitly described herein.

In some cases, the directional signals 315 may include information associated with wireless node 305-*c*, or may include information associated with the communications session between wireless node 305-*c* and wireless node 305-*d*. For instance, the set of directional signals 315 may include a signal or message, and may include information that indicates an identity of wireless node 305-*c*, or information that provides a direction of transmission 325, or an expected duration of transmission 325. The set of directional signals 315 may include synchronization signals (such as a primary synchronization signal (PSS), a secondary synchronization signal (SSS), etc.), a broadcast message (e.g., a physical broadcast channel (PBCH)), a reference signal, or a combination thereof. For example, the PSS, SSS, and/or the broadcast message (e.g., PBCH) may be transmitted within different synchronization signal blocks on respective directional signals 315, where one or more synchronization signal blocks may be included within a synchronization signal burst (SSB). Additionally, the directional signals 315 may provide timing information that is associated with wireless node 305-*c*.

Figure 4:
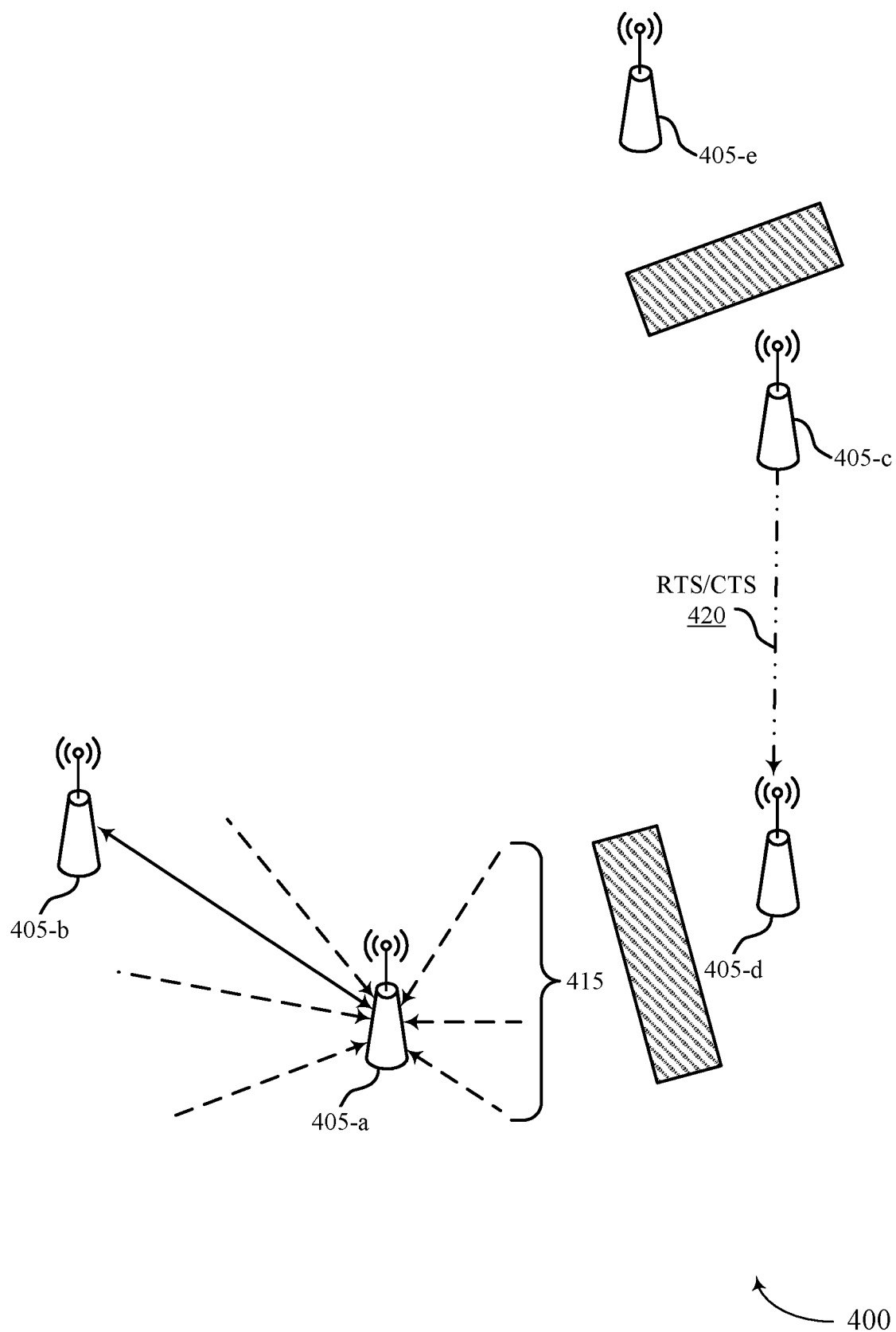

FIG. 4 illustrates an example of a wireless communications system 400 in accordance with various aspects of the present disclosure. In some examples, wireless communications system 400 may implement aspects of wireless communications system 100. Wireless communications system 400 may include multiple wireless nodes 405 (e.g., wireless nodes 405-*a* through 405-*e*). Each wireless node 405 may be, for example, a UE 115, a base station 105, a mobile station, a mobile terminal, or another wireless communications device. The wireless nodes 405 may be corresponding examples of the wireless nodes 205 and wireless nodes 305 as described with reference to FIGS. 2 and 3, respectively. Wireless communications system 400 may illustrate aspects of simultaneous reception sweep and transmission.

In some cases, a wireless node 405 that support full-duplex communications may, while transmitting, listen in all directions in a sweeping manner to detect potential interference. For example, wireless node 405-*a* may, while concurrently transmitting to wireless node 405-*b*, listen in a sweeping manner in all directions 415 (e.g., in accordance with a reception pattern). That is, the transmission to wireless node 405-*b* and the listening (or receiving) in various direction may occur simultaneously. Alternatively, wireless node 405-*a* may send a transmission to wireless node 405-*b*, and then sweep across directions 415, or vice versa. In any case, wireless node 405-*a* may then detect, for example, RTS/CTS 420 transmitted from wireless node 405-*c* to wireless node 405-*d* (e.g., as part of an LBT process). Wireless node 405-*a* may detect RTS/CTS 420 because the angle of the transmission from wireless node 405-*c* to wireless node 405-*d* is relatively close to a direction 415 towards the location of wireless node 405-*a*, and a direction in which wireless node was listening through the sweeping reception pattern.

Based on having detected the RTS/CTS 420 transmitted by wireless node 405-*c*, wireless node 405-*a* may determine to refrain from transmitting in the direction 415 from which RTS/CTS 420 was received (e.g., towards a location corresponding to wireless node 405-*c*). Thus, wireless node 405-*c* may avoid potential interference from wireless node 405-*a*. In some cases, wireless node 405-*a* may listen in only a subset of all possible directions 415. For example, wireless node 405-*a* may listen only the directions 415 that are towards one of the other wireless nodes 405 of a list of wireless nodes 405 (e.g., wireless node 405-*a* may be aware of nearby wireless nodes 405 and their position, physical/geographic location, and/or direction relative to wireless node 405-*a*). In some cases, this list of potential wireless nodes 405 may be signaled to wireless node 405-*a* in advance (e.g., by a master node). In other cases, wireless node 405-*a* may detect various transmissions previously sent by other wireless nodes 405 in wireless communications system 400, and may determine locations of the other wireless nodes 405 based on the previous transmissions (e.g., using the direction of these prior transmissions).

As described above with reference to the transmission of directional signals, listening in accordance with a sweeping receive pattern may include listening through a plurality of different angles or directions by wireless node 405-*a*. For instance, wireless node 405-*a* may listen for signals through a full 360 degree sweep (e.g., different directions at different times) to ensure that any transmissions from surrounding wireless nodes 405 are received. Further, wireless node 405-*a* may also sweep in non-planar directions, which may account for a difference in elevation for different wireless nodes 405. Other types of directional receive patterns or sequences for listening in different directions 415 may be possible even if not explicitly described herein.

Figure 5:
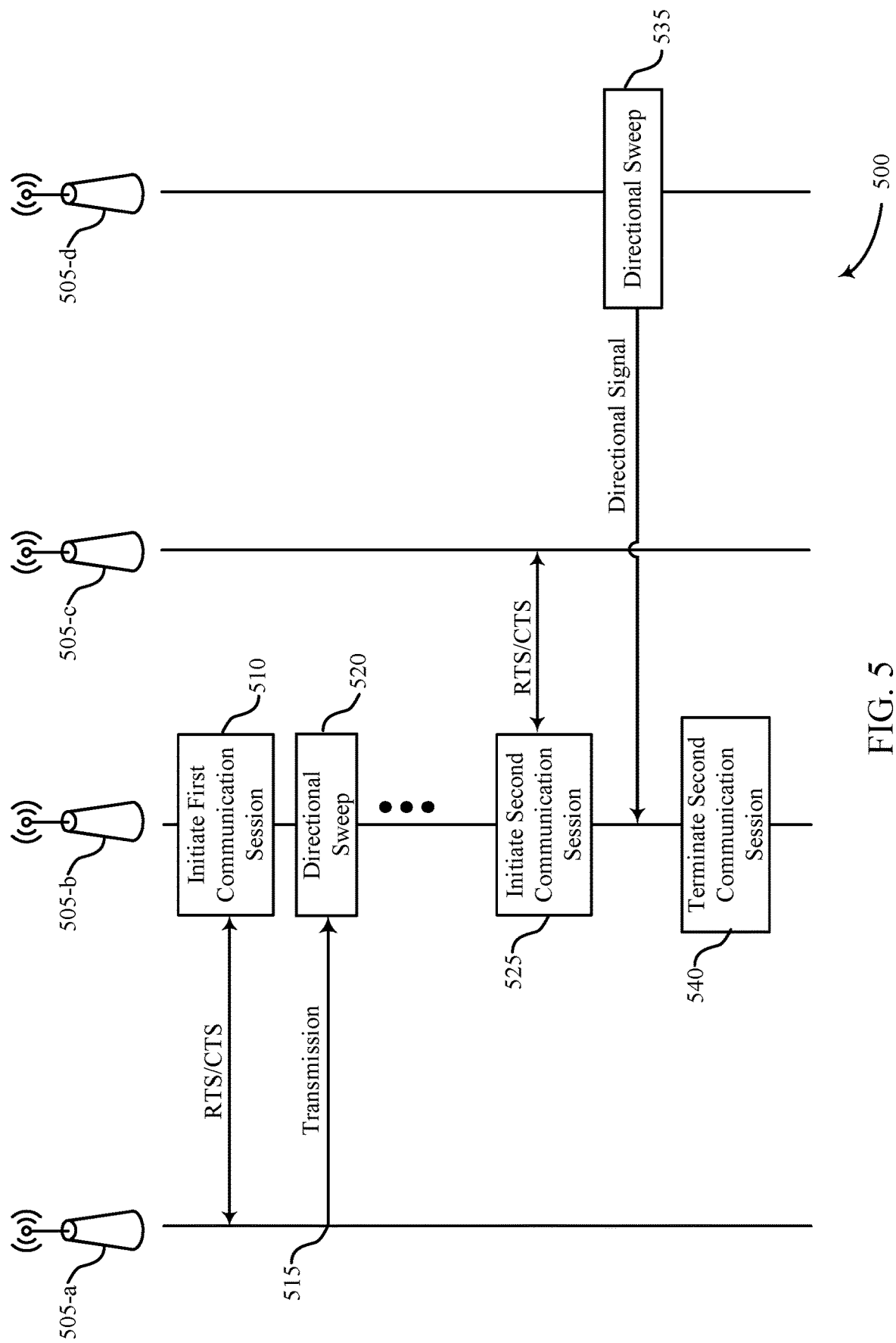
FIGS. 5 and 6 illustrate examples of process flows in accordance with aspects of the present disclosure.

FIG. 5 illustrates an example of a process flow 500 in accordance with various aspects of the present disclosure. In some examples, process flow 500 may implement aspects of wireless communications system 100. Process flow 500 may be an example of the technique described above with reference to FIG. 3. Process flow 500 may illustrate aspects of communications and procedures executed by wireless nodes 505 including, for example, a first wireless node 505-*a* through 505-*d*. Each wireless node 505 may be, for example, a UE 115, a base station 105, a mobile station, a mobile terminal, or another wireless communications device. In some examples, the functions each wireless node 505 may be performed by another of the wireless nodes 505 in different or opposite directions. In some cases, one or more of the wireless nodes 505 may support full-duplex communications.

At 510, wireless node 505-*b* may initiate a first communication session with wireless node 505-*a*. Initiating the first communication session may include performing a first LBT process. In some cases, a first communication session may include, for example, transmitting and receiving respective RTS and CTS messages, and if the medium is free from other transmissions, the wireless nodes 505 may proceed to communicate.

At 515, wireless node 505-*a* may accordingly transmit to wireless node 505-*b*, and wireless node 505-*b* may receive a first transmission from wireless node 505-*a*. In some cases, the first transmission may be, for example, backhaul data. Simultaneous to receiving the first transmission sent at 515, wireless node 505-*b* may perform a directional sweep at 520. Performing the directional sweep may include transmitting a set of directional signals according to a sweeping transmission pattern. In some cases, the sweeping transmission pattern may include transmitting each of the directional signals to one or more other wireless nodes 505 in different transmission directions during respective time intervals. The transmission directions may have predefined angular separations from each other. In some cases, the transmission directions of the directional signals may be directed away from and be different than a direction of the first transmission, as received from wireless node 505-*a*.

In some cases, wireless node 505-b may transmit each directional signal of the set of directional signals on a same radio frequency band as the first transmission from wireless node 505-a to wireless node 505-b. The set of directional signals may include information indicating, for example, an identity of wireless node 505-b, an expected duration for the first transmission as received at 515, a transmission direction for the first transmission, and information to inform (i.e., to provide corresponding parameters for) LBT processes at one or more additional wireless nodes 505. In some cases, an inclusion of information in the set of directional signals may further include, for example, a generated sequence or message (e.g., a broadcast message), synchronization signal, or reference signal. Such a synchronization signal may convey timing information for wireless node 505-b.

Some time after communicating with wireless node 505-a, wireless node 505-b may initiate a second communication session with wireless node 505-c at 525. The second communication session may include performing a second LBT process. For example, as described above, performing the LBT process may include exchanging RTS and CTS messages between wireless node 505-b and wireless node 505-c.

However, at 535, wireless node 505-d may perform a directional sweep (e.g., while communicating with another node (not shown)). Performing the directional sweep may include transmitting a set of directional signals according to a sweeping transmission pattern, and wireless node 505-b may detect the directional signals sent by wireless node 505-d. Due to the directional signals sent by wireless node 505-d in a sweeping transmission pattern, neighboring wireless nodes 505 in the system may recognize that future transmissions may be sent by wireless node 505-d, and these neighboring wireless nodes 505 may accordingly refrain from transmitting in certain directions during communication. At 540, based on having received the directional signal, wireless node 505-b may thus terminate the second communication session so as to avoid potential interference. However, in such cases, wireless node 505-b may not have to receive in a sweeping manner to detect the transmitted signal from wireless node 505-d (although, receiving in accordance with a sweeping receive pattern may be used to detect the directional transmission). That is, it may not be necessary to receive in a sweeping manner to detect a set of directional transmissions sent in a sweeping manner, and these mechanisms are each sufficient on their own to prevent interference.

Figure 6:
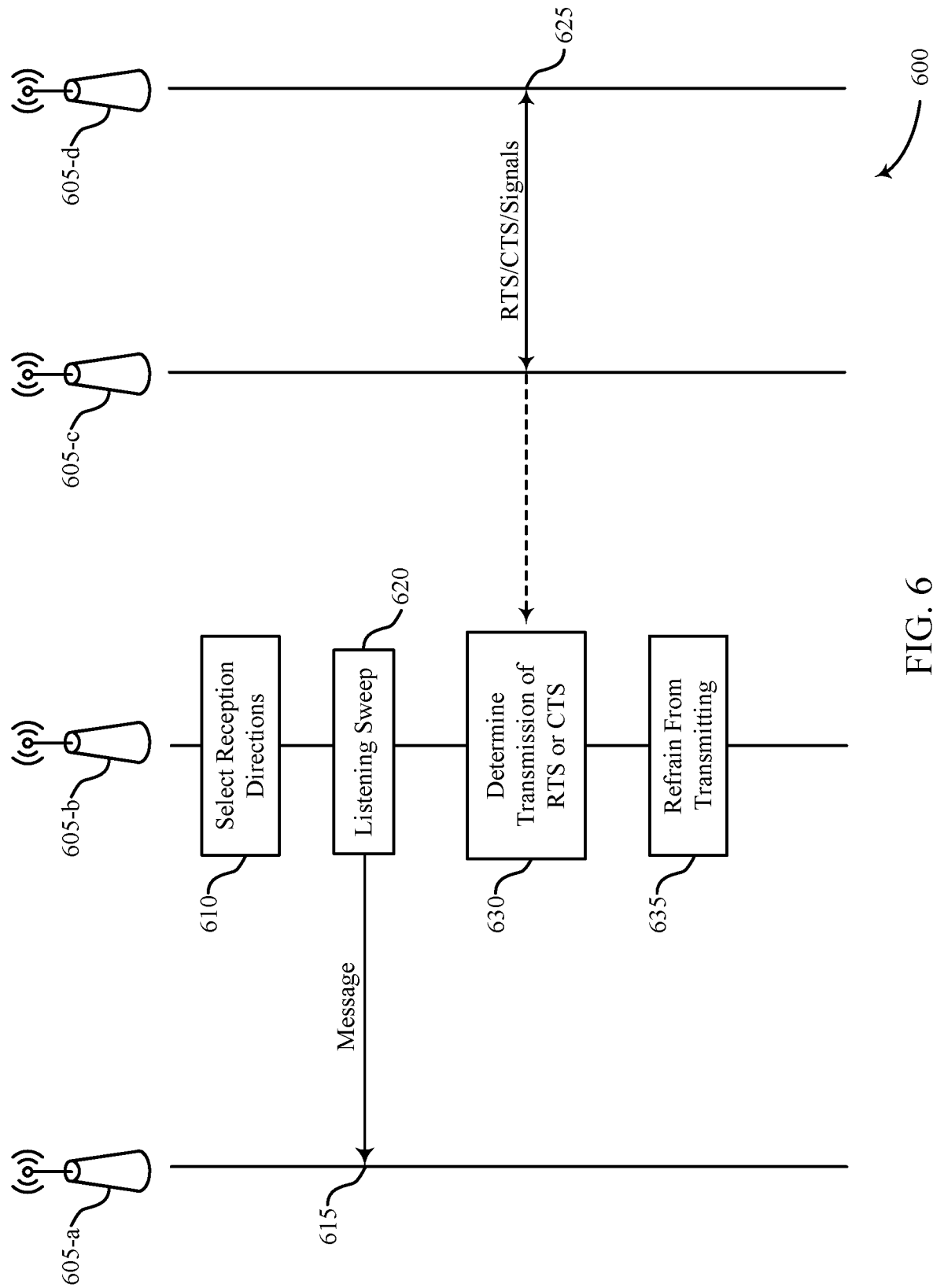

FIG. 6 illustrates an example of a process flow 600 in accordance with various aspects of the present disclosure. In some examples, process flow 600 may implement aspects of wireless communications system 100. Process flow 600 may be an example of the technique described above with reference to FIG. 4. Process flow 600 may illustrate aspects of communications and procedures executed by wireless nodes 605 including, for example, a first wireless node 505-a through 505-d. Each wireless node 605 may be, for example, a UE 115, a base station 105, a mobile station, a mobile terminal, or another wireless communications device. In some examples, the functions each wireless node 605 may be performed by another of the wireless nodes 605 in different or opposite directions and orientations. In some cases, one or more of the wireless nodes 605 may support full-duplex communications.

At 610, a wireless node 605-b may select a set of reception directions for a sweeping receive pattern. In some cases, the selection may be based on prior signaling transmitted by one or more additional wireless nodes 605 (e.g., wireless node 605-c, wireless node 605-d, etc.). In some examples, prior signaling received by wireless node 605-b may indicate a cell identity of one of more additional wireless nodes 605. In some cases, wireless node 605-b may determine respective locations of the one or more additional wireless nodes based on the prior signaling. Additionally or alternatively, wireless node 605-b may receive an indication of respective locations of the one or more additional wireless nodes 605 (e.g., from a serving or controlling node (not shown)), where selecting the set of reception directions is based on the received indication. In some other cases, wireless node 605-b may receive an indication of a transmission configuration indicator (TCI) for at least one reference signal transmitted by the one or more additional wireless nodes, where selecting the set of reception directions is based on receiving the indication of the TCI.

At 615, wireless node 605-a and wireless node 605-b may communicate with each other, and wireless node 605-b may accordingly transmit a first message to wireless node 605-a. Additionally, at 620, wireless node 605-b may perform a listening sweep while concurrently transmitting the first message to wireless node 605-a. The listening sweep may include listening, in accordance with a sweeping receive pattern, for one or more signals from one or more additional wireless nodes in a corresponding direction. The sweeping receive pattern may include multiple receive directions, where each receive direction may be separated by a predefined angular separation. In some cases, the receive directions may each be different than a direction corresponding to the transmission direction of the first message transmitted at 610 to wireless node 605-a. Wireless node 605-b may accordingly listen for one or more signals from an additional wireless node 605 in different reception directions during respective time intervals. Additionally, wireless node 605-b may listen for a sequence or a message transmitted by the one or more additional wireless nodes 605. In such cases, the sequence or the message may convey a cell identity of the one or more additional wireless nodes 605, a timing reference of the one or more additional wireless nodes 605, or any combination thereof. In some cases, wireless node 605-b may transmit the first message and receive one or more signals in a same radio frequency band.

For example, wireless node 605-b may listen for one or more RTS and CTS signals from the one or more additional wireless nodes 605 while transmitting, and may receive the one or more signals during the respective time intervals. For example, wireless node 605-c and wireless node 605-d may perform an LBT process and exchange transmissions of RTS and CTS to initialize a communications session at 625. Accordingly, at 630, wireless node 605-b may determine that an RTS or CTS is being transmitted by wireless node 605-c and/or wireless node 605-d. Based on the received signals transmitted by wireless node 605-c or wireless node 605-d, wireless node 605-b may determine that any transmissions in the direction of those nodes may interfere with communications. Accordingly, at 635, wireless node 605-b may refrain from transmitting a second message in a direction corresponding to wireless nodes 605-c and 605-d based on the determined transmission of the RTS or CTS at 630.

Figure 7:
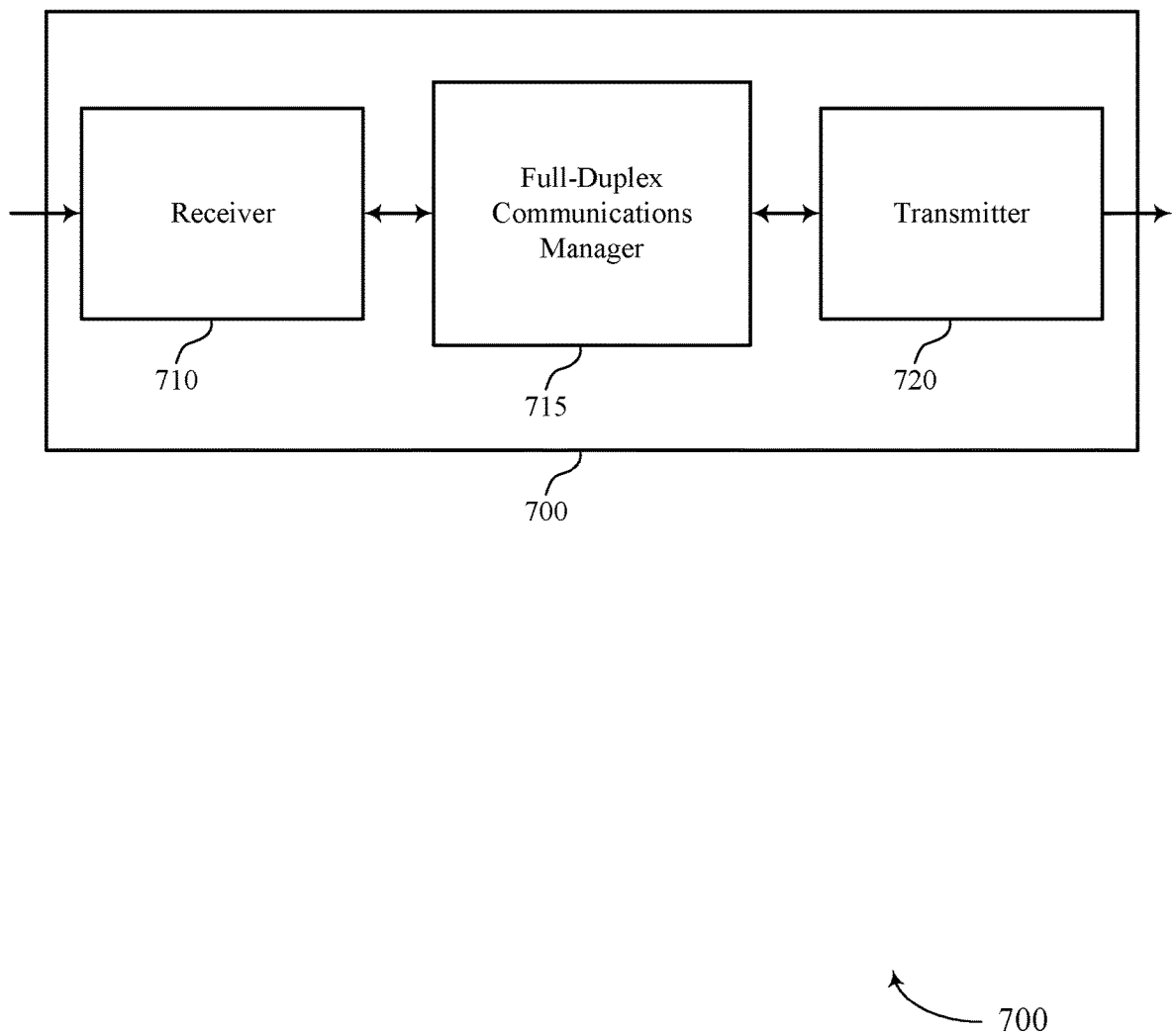
FIGS. 7 through 9 show block diagrams of a device in accordance with aspects of the present disclosure.

FIG. 7 shows a block diagram 700 of a wireless device 705 in accordance with aspects of the present disclosure. Wireless device 705 may be an example of aspects of a wireless device, such as a UE 115, a base station 105, a wireless node 205, a wireless node 305, a wireless node 405, a wireless node 505, or a wireless node 605, as described with reference to FIGS. 1 through 6. Wireless device 705 may include receiver 710, full-duplex communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to transmission and reception sweeping in a full-duplex node, etc.). Information may be passed on to other components of the device. The receiver 710 may be an example of aspects of the transceiver 1035 described with reference to FIG. 10. The receiver 710 may utilize a single antenna or a set of antennas.

Full-duplex communications manager 715 may be an example of aspects of the full-duplex communications manager 1015 described with reference to FIG. 10. Full-duplex communications manager 715 and/or at least some of its various sub-components may be implemented in hardware, software executed by a processor, firmware, or any combination thereof. If implemented in software executed by a processor, the functions of the full-duplex communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The full-duplex communications manager 715 and/or at least some of its various sub-components may be physically located at various positions, including being distributed such that portions of functions are implemented at different physical locations by one or more physical devices. In some examples, full-duplex communications manager 715 and/or at least some of its various sub-components may be a separate and distinct component in accordance with various aspects of the present disclosure. In other examples, full-duplex communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Full-duplex communications manager 715 may receive a first transmission from a second wireless node and transmit, while concurrently receiving the first transmission, a set of directional signals in accordance with a sweeping transmission pattern. In some examples, full-duplex communications manager 715 may transmit a first message to a second wireless node and listen, while concurrently transmitting the first message and in accordance with a sweeping receive pattern, for one or more signals from one or more additional wireless nodes in a corresponding direction.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
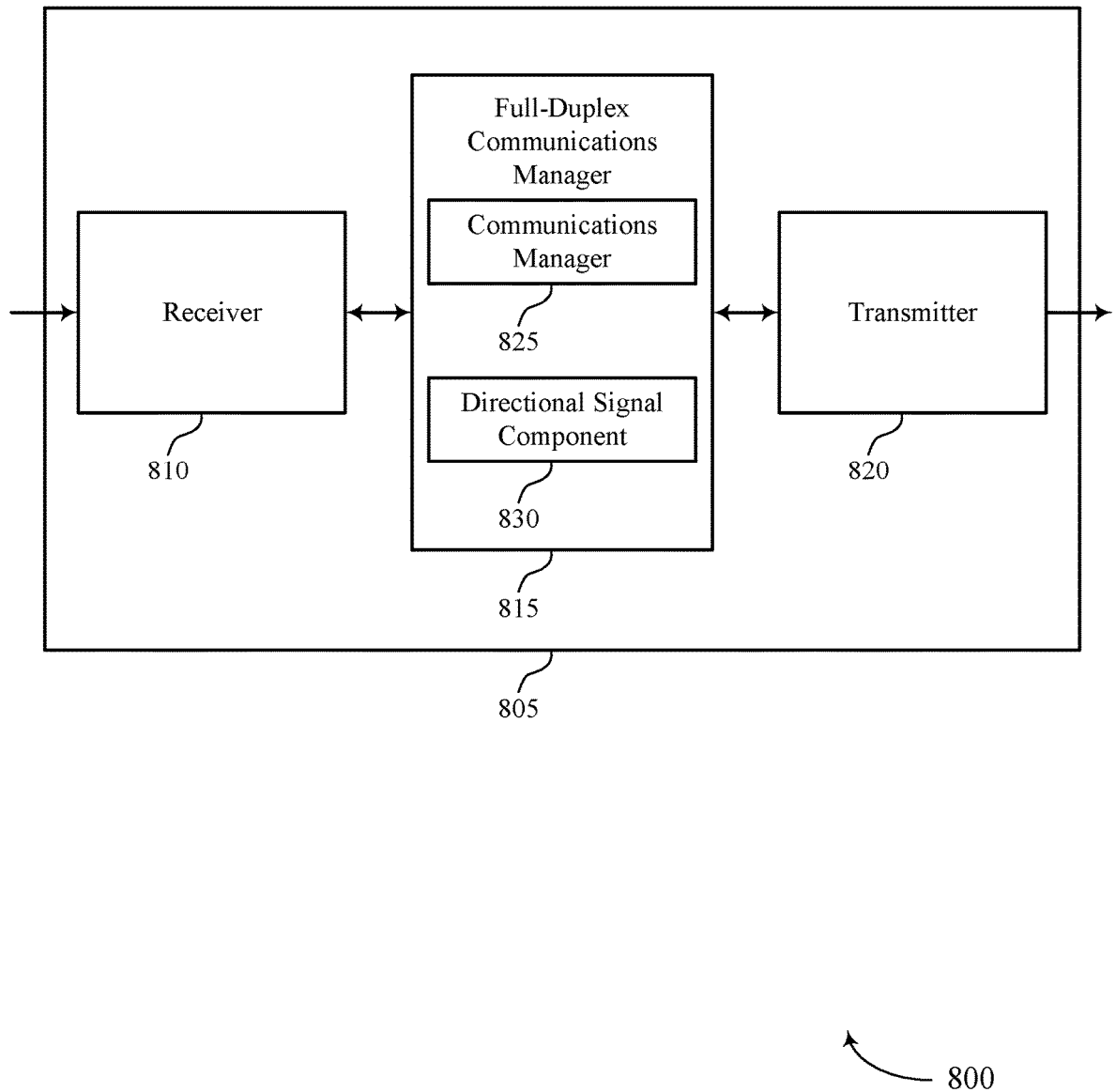

FIG. 8 shows a block diagram 800 of a wireless device 805 in accordance with aspects of the present disclosure. Wireless device 805 may be an example of aspects of a wireless device 705 as described with reference to FIG. 7, or a UE 115, a base station 105, a wireless node 205, a wireless node 305, a wireless node 405, a wireless node 505, or a wireless node 605, as described with reference to FIGS. 1 through 6. Wireless device 805 may include receiver 810, full-duplex communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to transmission and reception sweeping in a full-duplex node, etc.). Information may be passed on to other components of the device. The receiver 810 may be an example of aspects of the transceiver 1035 described with reference to FIG. 10. The receiver 810 may utilize a single antenna or a set of antennas.

Full-duplex communications manager 815 may be an example of aspects of the full-duplex communications manager 1015 described with reference to FIG. 10. Full-duplex communications manager 815 may also include communications manager 825 and directional signal component 830.

Communications manager 825 may receive a first transmission from a second wireless node and terminate the second communication session with the third wireless node based on receiving the directional signal from the fourth wireless node. In some cases, the first wireless node receives the first transmission and transmits a set of directional signals in a same radio frequency band. In some cases, the first wireless node supports full-duplex communications. In some cases, the first transmission includes backhaul data, and each directional signal includes a sweeping signal to one or more user equipment. In some examples, communications manager 825 may transmit a first message to a second wireless node. In some cases, communications manager 825 may refrain from transmitting a second message in a direction corresponding to at least one or more additional wireless nodes (e.g., upon detecting an LBT process by the one or more additional wireless nodes).

Directional signal component 830 may transmit, while concurrently receiving the first transmission, a set of directional signals in accordance with a sweeping transmission pattern. In some cases, directional signal component 830 may receive, during a second LBT process, a directional signal from a fourth wireless node, where the directional signal from the fourth wireless node is a signal transmitted in accordance with the sweeping transmission pattern. In some cases, the set of directional signals includes information including an identity of the first wireless node, an expected duration of the first transmission, a transmission direction of the first transmission, or any combination thereof. Accordingly, the set of directional signals may include information to inform LBT processes at one or more additional wireless nodes.

In some cases, transmitting the set of directional signals in accordance with the sweeping transmission pattern includes transmitting each directional signal of the set of directional signals in a different direction during a respective time interval. In some cases, the sweeping transmission pattern includes a set of transmission directions having a predefined angular separation between each of the set of transmission directions. In some cases, the set of transmission directions are different than a direction corresponding to receipt of the first transmission.

In some cases, the set of directional signals includes a plurality of reference signals. A first reference signal of the plurality of reference signals may include a first TCI and a second reference signal of the plurality of reference signals may include a second TCI. In some examples, each reference signal of the plurality of reference signals may include a distinct TCI. In some cases, transmitting the indication of the TCI for each reference signal may occur prior to transmitting the set of directional signals. The transmission of the TCI for each reference signal may be a broadcast transmission or a unicast transmission.

In some cases, the set of directional signals includes a set of reference signals. In such cases, at least a first reference signal of the set of reference signals may include a first TCI and a second reference signal of the plurality of reference signals may include a second TCI. In some examples, each reference signal of the plurality of reference signals may include a distinct TCI. That is, respective reference signals may include different TCIs. In some cases, transmitting the indication of the TCI for each reference signal may occur prior to transmitting the set of directional signals. The transmission of the TCI for each reference signal may be broadcast or unicast from one wireless node to one or more other wireless nodes.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
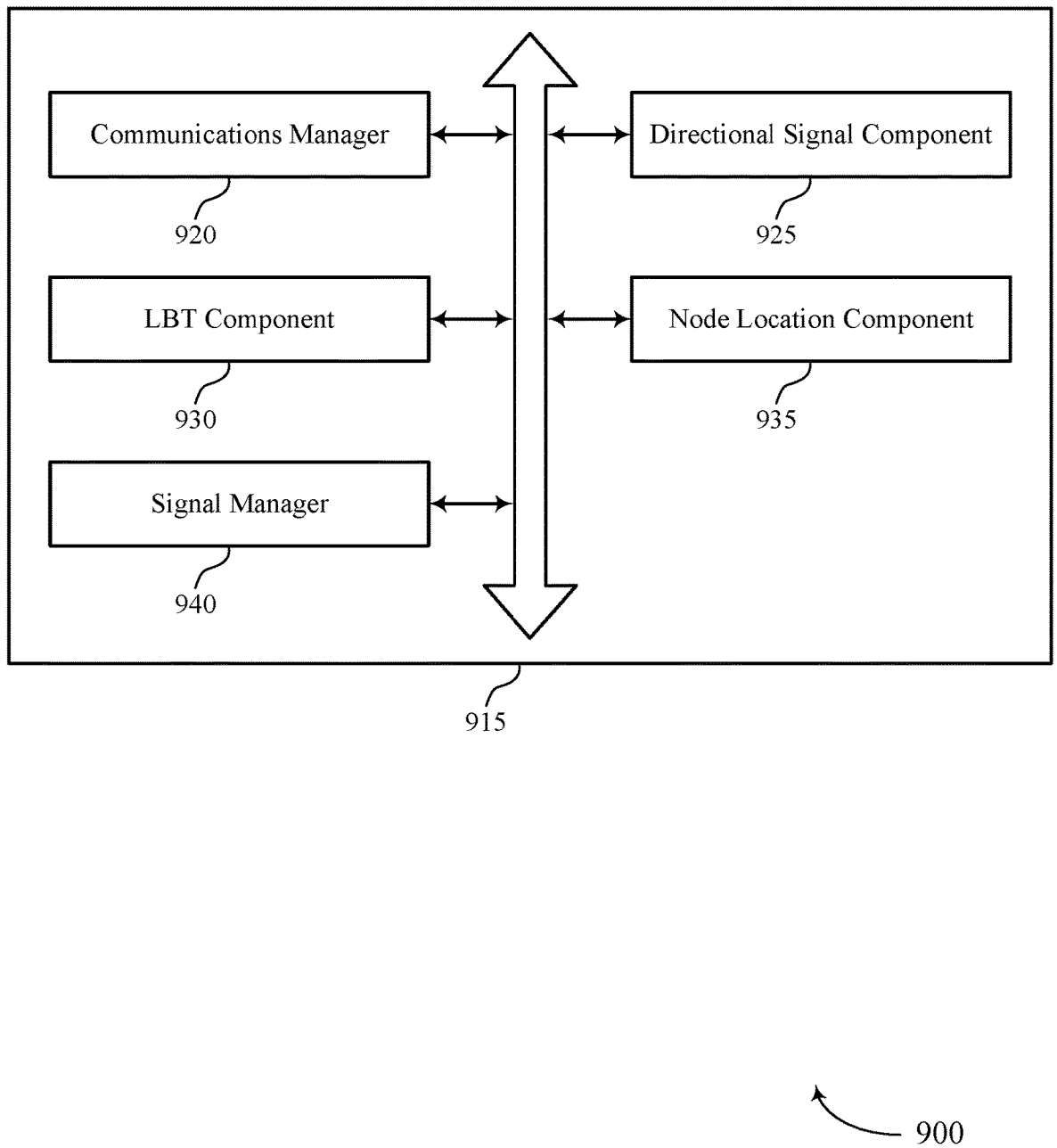

FIG. 9 shows a block diagram 900 of a full-duplex communications manager 915 in accordance with aspects of the present disclosure. The full-duplex communications manager 915 may be an example of aspects of a full-duplex communications manager 715, a full-duplex communications manager 815, or a full-duplex communications manager 1015 described with reference to FIGS. 7, 8, and 10. The full-duplex communications manager 915 may include communications manager 920, directional signal component 925, LBT component 930, node location component 935, and signal manager 940. Each of these modules may communicate, directly or indirectly, with one another (e.g., via one or more buses).

Communications manager 920 may receive a first transmission from a second wireless node. In some examples, communications manager 920 and terminate the second communication session with the third wireless node based on receiving the directional signal from the fourth wireless node. In some cases, the first wireless node may receive the first transmission and transmit a set of directional signals in a same radio frequency band. In some cases, the first wireless node supports full-duplex communications. In some cases, the first transmission includes backhaul data, and each directional signal includes a sweeping signal to one or more user equipment. In some cases, communications manager 920 may transmit a first message to a second wireless node. Additionally, communications manager 920 may refrain from transmitting a second message in a direction corresponding to at least one of the one or more additional wireless nodes (e.g., should a CTS or RTS be detected from the one or more additional nodes). In some cases, the first wireless node transmits the first message and receives one or more signals in a same radio frequency band.

Directional signal component 925 may transmit, while concurrently receiving the first transmission, a set of directional signals in accordance with a sweeping transmission pattern. In some cases, directional signal component 925 may receive, during a second LBT process, a directional signal from a fourth wireless node, where the directional signal from the fourth wireless node is a signal transmitted in accordance with the sweeping transmission pattern. In some cases, the set of directional signals includes information including an identity of the first wireless node, an expected duration of the first transmission, a transmission direction of the first transmission, or any combination thereof. In some cases, the set of directional signals includes information to inform LBT processes at one or more additional wireless nodes. That is, the set of directional signals may be received during an LBT process performed at the one or more additional wireless nodes.

In some cases, transmitting the set of directional signals in accordance with the sweeping transmission pattern includes transmitting each directional signal of the set of directional signals in a different direction during a respective time interval. In some cases, the sweeping transmission pattern includes a set of transmission directions having a predefined angular separation between each of the set of transmission directions. In some cases, the set of transmission directions are different than a direction corresponding to receipt of the first transmission.

In some examples, directional signal component 925 may listen, while concurrently transmitting the first message and in accordance with a sweeping receive pattern, for one or more signals from one or more additional wireless nodes in a corresponding direction and receive the one or more signals during the respective time intervals. In some cases, listening for the one or more signals includes listening in a set of reception directions during respective time intervals. In some cases, the sweeping receive pattern includes a set of receive directions having a predefined angular separation between each of the set of receive directions. In some cases, the set of receive directions are different than a direction corresponding to transmission of the first message to the second wireless node. In some cases, directional signal component 925 may receive the one or more signals from the one or more additional wireless nodes, where the one or more signals include a reference signal transmitted by the one or more additional wireless nodes. In some cases, directional signal component 925 may receive an indication of a TCI for at least one reference signal transmitted by the one or more additional nodes.

LBT component 930 may initiate a first communication session with the second wireless node, where initiating the first communication session includes performing a first LBT process and initiate, at a later time, a second communication session with a third wireless node, where initiating the second communication session includes performing a second LBT process. Additionally or alternatively, LBT component 930 may determine that an RTS or CTS is being transmitted by at least one of the one or more additional wireless nodes. Accordingly, listening for the one or more signals may include listening (e.g., in a sweeping manner) for one or more RTS and CTS signals from the one or more additional wireless nodes.

Node location component 935 may select a set of reception directions for the sweeping receive pattern based on prior signaling transmitted by the one or more additional wireless nodes, determine respective locations of the one or more additional wireless nodes based on the prior signaling, and receive an indication of respective locations of the one or more additional wireless nodes, where selecting the set of reception directions is based on the indication.

Signal manager 940 may generate a sequence, a message, or a combination thereof for inclusion in the set of directional signals prior to transmitting the set of directional signals. Additionally or alternatively, signal manager 940 may generate one or more synchronization signals, a broadcast message, a reference signal, or a combination thereof for inclusion in the set of directional signals prior to transmitting the set of directional signals. In some cases, the one or more synchronization signals convey timing information for the first wireless node. In some cases, signal manager 940 may listen for a sequence or a message transmitted by the one or more additional wireless nodes, and the sequence or the message may convey at least a cell identity of the one or more additional wireless nodes, a timing reference of the one or more additional wireless nodes, or any combination thereof. In some examples, the sequence or the message may be received prior to listening for the one or more signals from the one or more additional wireless nodes.

Figure 10:
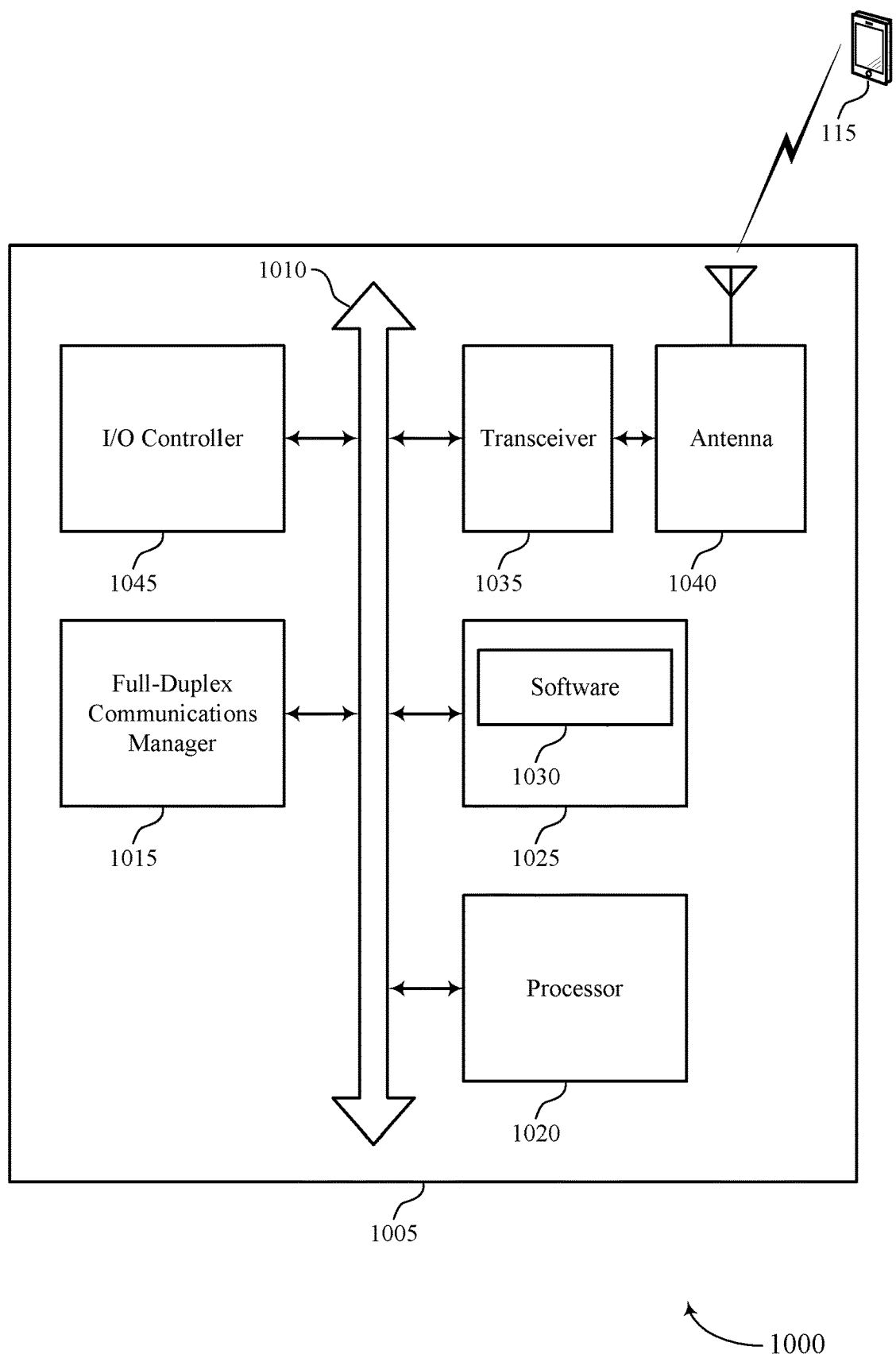
FIG. 10 illustrates a block diagram of a system including a wireless device in accordance with aspects of the present disclosure.

FIG. 10 shows a diagram of a system 1000 including a device 1005 in accordance with aspects of the present disclosure. Device 1005 may be an example of or include the components of wireless device 705, wireless device 805, or a wireless node as described above, e.g., with reference to FIGS. 2 through 8. Device 1005 may include components for bi-directional voice and data communications including components for transmitting and receiving communications, including full-duplex communications manager 1015, processor 1020, memory 1025, software 1030, transceiver 1035, antenna 1040, and I/O controller 1045. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting transmission and reception sweeping in a full-duplex node).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support transmission and reception sweeping in a full-duplex node. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions. I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
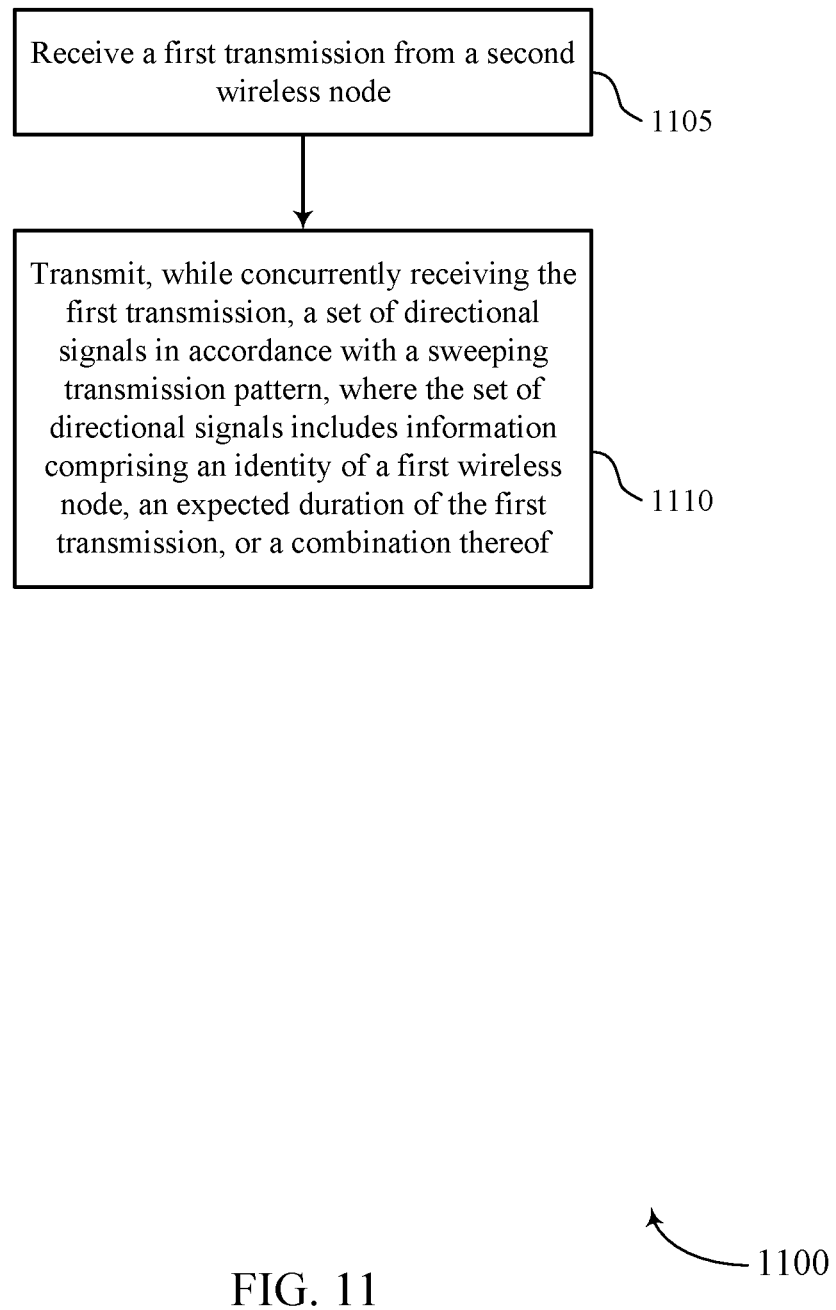
FIGS. 11 through 15 illustrate methods for transmission and reception sweeping in accordance with aspects of the present disclosure.

FIG. 11 shows a flowchart illustrating a method 1100 in accordance with aspects of the present disclosure. The operations of method 1100 may be implemented by a wireless node, such as a wireless device, a UE 115, a base station 105, an AP, and the like, or its components as described herein. For example, the operations of method 1100 may be performed by a full-duplex communications manager as described with reference to FIGS. 7 through 10. In some examples, a wireless node may execute a set of codes to control the functional elements of the device to perform the functions described below. Additionally or alternatively, the wireless node may perform aspects of the functions described below using special-purpose hardware.

At block 1105 the wireless node may receive a first transmission from a second wireless node. The operations of block 1105 may be performed according to the methods described herein. In certain examples, aspects of the operations of block 1105 may be performed by a communications manager as described with reference to FIGS. 7 through 10.

At block 1110 the wireless node may transmit, while concurrently receiving the first transmission, a set of directional signals in accordance with a sweeping transmission pattern, where the set of directional signals includes an identity of the wireless node or an expected duration of the first transmission, or both The operations of block 1110 may be performed according to the methods described herein. In certain examples, aspects of the operations of block 1110 may be performed by a directional signal component as described with reference to FIGS. 7 through 10.

Figure 12:
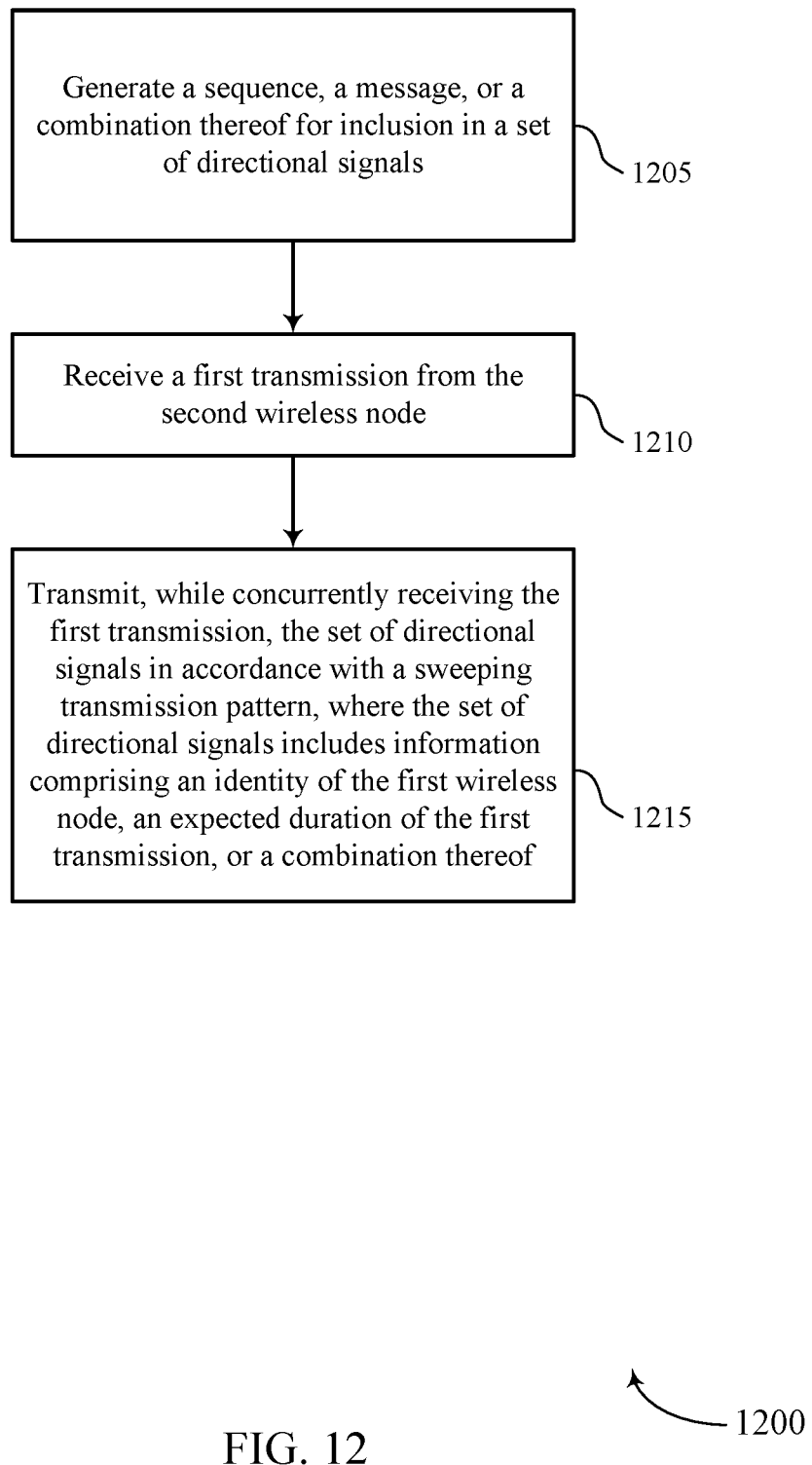

FIG. 12 shows a flowchart illustrating a method 1200 in accordance with aspects of the present disclosure. The operations of method 1200 may be implemented by a wireless node, such as a wireless device, a UE 115, a base station 105, an AP, and the like, or its components as described herein. For example, the operations of method 1200 may be performed by a full-duplex communications manager as described with reference to FIGS. 7 through 10. In some examples, a wireless node may execute a set of codes to control the functional elements of the device to perform the functions described below. Additionally or alternatively, the wireless node may perform aspects of the functions described below using special-purpose hardware.

At block 1205 the wireless node may generate a sequence, a message, or a combination thereof for inclusion in a set of directional signals. The operations of block 1205 may be performed according to the methods described herein. In certain examples, aspects of the operations of block 1205 may be performed by a signal manager as described with reference to FIGS. 7 through 10.

At block 1210 the wireless node may receive a first transmission from a second wireless node. The operations of block 1210 may be performed according to the methods described herein. In certain examples, aspects of the operations of block 1210 may be performed by a communications manager as described with reference to FIGS. 7 through 10.

At block 1215 the wireless node may transmit, while concurrently receiving the first transmission, a set of directional signals in accordance with a sweeping transmission pattern, where the set of directional signals includes an identity of the wireless node or an expected duration of the first transmission, or both. The operations of block 1215 may be performed according to the methods described herein. In certain examples, aspects of the operations of block 1215 may be performed by a directional signal component as described with reference to FIGS. 7 through 10.

Figure 13:
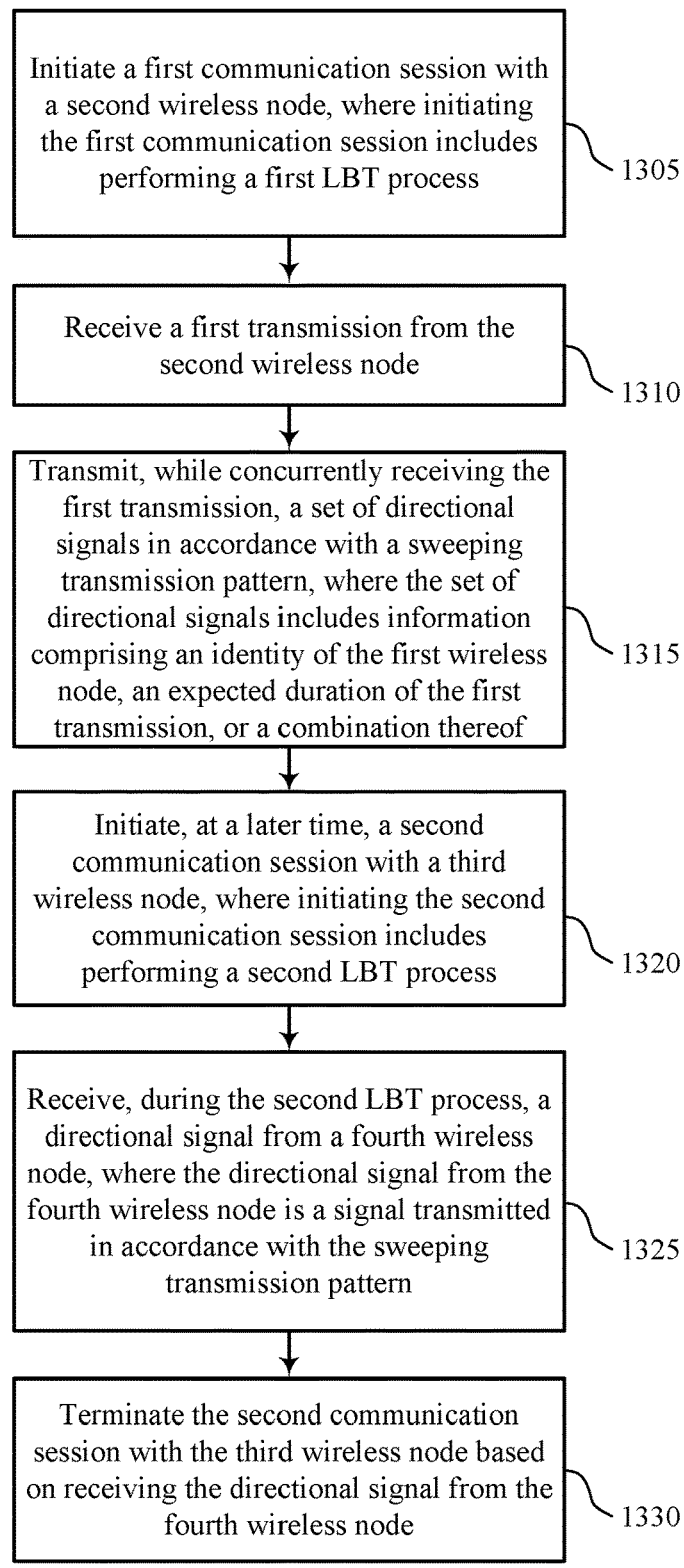

FIG. 13 shows a flowchart illustrating a method 1300 in accordance with aspects of the present disclosure. The operations of method 1300 may be implemented by a wireless node, such as a wireless device, a UE 115, a base station 105, an AP, and the like, or its components as described herein. For example, the operations of method 1300 may be performed by a full-duplex communications manager as described with reference to FIGS. 7 through 10. In some examples, a wireless node may execute a set of codes to control the functional elements of the device to perform the functions described below. Additionally or alternatively, the wireless node may perform aspects of the functions described below using special-purpose hardware.

At block 1305 the wireless node may initiate a first communication session with a second wireless node, wherein initiating the first communication session includes performing a first LBT process. The operations of block 1305 may be performed according to the methods described herein. In certain examples, aspects of the operations of block 1305 may be performed by an LBT component as described with reference to FIGS. 7 through 10.

At block 1310 the wireless node may receive a first transmission from the second wireless node. The operations of block 1310 may be performed according to the methods described herein. In certain examples, aspects of the operations of block 1310 may be performed by a communications manager as described with reference to FIGS. 7 through 10.

At block 1315 the wireless node may transmit, while concurrently receiving the first transmission, a set of directional signals in accordance with a sweeping transmission pattern, where the set of directional signals includes an identity of the wireless node or an expected duration of a transmission, or both. The operations of block 1315 may be performed according to the methods described herein. In certain examples, aspects of the operations of block 1315 may be performed by a directional signal component as described with reference to FIGS. 7 through 10.

At block 1320 the wireless node may initiate, at a later time, a second communication session with a third wireless node, wherein initiating the second communication session includes performing a second LBT process. The operations of block 1320 may be performed according to the methods described herein. In certain examples, aspects of the operations of block 1320 may be performed by an LBT component as described with reference to FIGS. 7 through 10.

At block 1325 the wireless node may receive, during the second LBT process, a directional signal from a fourth wireless node, wherein the directional signal from the fourth wireless node is a signal transmitted in accordance with the sweeping transmission pattern. The operations of block 1325 may be performed according to the methods described herein. In certain examples, aspects of the operations of block 1325 may be performed by a directional signal component as described with reference to FIGS. 7 through 10.

At block 1330 the wireless node may terminate the second communication session with the third wireless node based on receiving the directional signal from the fourth wireless node. The operations of block 1330 may be performed according to the methods described herein. In certain examples, aspects of the operations of block 1330 may be performed by a communications manager as described with reference to FIGS. 7 through 10.

Figure 14:
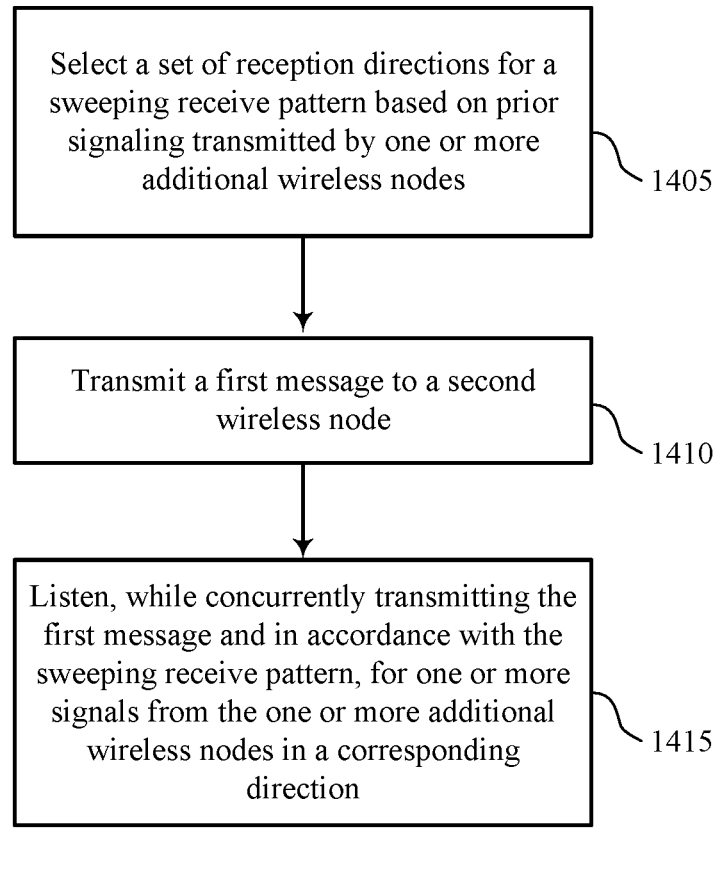

FIG. 14 shows a flowchart illustrating a method 1400 in accordance with aspects of the present disclosure. The operations of method 1400 may be implemented by a wireless node, such as a wireless device, a UE 115, a base station 105, an AP, and the like, or its components as described herein. For example, the operations of method 1400 may be performed by a full-duplex communications manager as described with reference to FIGS. 7 through 10. In some examples, a wireless node may execute a set of codes to control the functional elements of the device to perform the functions described below. Additionally or alternatively, the wireless node may perform aspects of the functions described below using special-purpose hardware.

At block 1405 the wireless node may select a plurality of reception directions for the sweeping receive pattern based at least in part on prior signaling transmitted by one or more additional wireless nodes. The operations of block 1405 may be performed according to the methods described herein. In certain examples, aspects of the operations of block 1405 may be performed by a node location component as described with reference to FIGS. 7 through 10.

At block 1410 the wireless node may transmit a first message to a second wireless node. The operations of block 1410 may be performed according to the methods described herein. In certain examples, aspects of the operations of block 1410 may be performed by a communications manager as described with reference to FIGS. 7 through 10.

At block 1415 the wireless node may listen, while concurrently transmitting the first message and in accordance with a sweeping receive pattern, for one or more signals from one or more additional wireless nodes in a corresponding direction. The operations of block 1415 may be performed according to the methods described herein. In certain examples, aspects of the operations of block 1415 may be performed by a directional signal component as described with reference to FIGS. 7 through 10.

Figure 15:
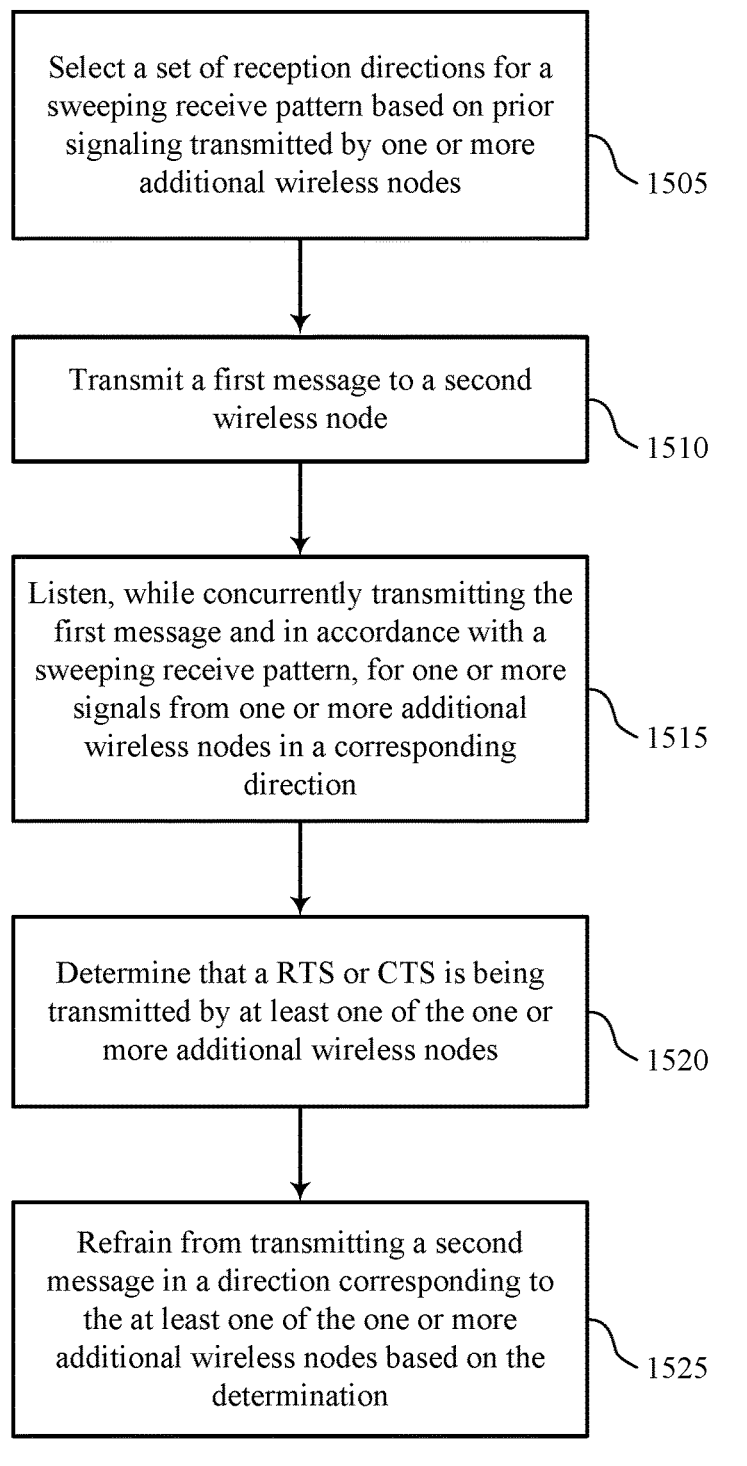

FIG. 15 shows a flowchart illustrating a method 1500 in accordance with aspects of the present disclosure. The operations of method 1500 may be implemented by a wireless node, such as a wireless device, a UE 115, a base station 105, an AP, and the like, or its components as described herein. For example, the operations of method 1500 may be performed by a full-duplex communications manager as described with reference to FIGS. 7 through 10. In some examples, a wireless node may execute a set of codes to control the functional elements of the device to perform the functions described below. Additionally or alternatively, the wireless node may perform aspects of the functions described below using special-purpose hardware.

At block 1505 the wireless node may select a plurality of reception directions for the sweeping receive pattern based at least in part on prior signaling transmitted by one or more additional wireless nodes. The operations of block 1505 may be performed according to the methods described herein. In certain examples, aspects of the operations of block 1505 may be performed by a node location component as described with reference to FIGS. 7 through 10.

At block 1510 the wireless node may transmit a first message to a second wireless node. The operations of block 1510 may be performed according to the methods described herein. In certain examples, aspects of the operations of block 1510 may be performed by a communications manager as described with reference to FIGS. 7 through 10.

At block 1515 the wireless node may listen, while concurrently transmitting the first message and in accordance with a sweeping receive pattern, for one or more signals from one or more additional wireless nodes in a corresponding direction. The operations of block 1515 may be performed according to the methods described herein. In certain examples, aspects of the operations of block 1515 may be performed by a directional signal component as described with reference to FIGS. 7 through 10.

At block 1520 the wireless node may determine that an RTS or CTS is being transmitted by at least one of the one or more additional wireless nodes. The operations of block 1520 may be performed according to the methods described herein. In certain examples, aspects of the operations of block 1520 may be performed by an LBT component as described with reference to FIGS. 7 through 10.

At block 1525 the wireless node may refrain from transmitting a second message in a direction corresponding to the at least one of the one or more additional wireless nodes based at least in part on the determination. The operations of block 1525 may be performed according to the methods described herein. In certain examples, aspects of the operations of block 1525 may be performed by a communications manager as described with reference to FIGS. 7 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless node, comprising:
    selecting a plurality of reception directions for a sweeping receive pattern based at least in part on prior signaling transmitted by one or more additional wireless nodes;
    transmitting a first message to a second wireless node; and
    listening, while concurrently transmitting the first message and in accordance with the selected plurality of reception directions for the sweeping receive pattern, for one or more signals from the one or more additional wireless nodes in a direction corresponding to the selected plurality of reception directions.

2. The method of claim 1, wherein the first wireless node supports full-duplex communications.

3. The method of claim 1, wherein the first wireless node transmits the first message and receives the one or more signals in a same radio frequency band.

4. The method of claim 1, wherein listening for the one or more signals comprises: listening for one or more request-to-send (RTS) and clear-to-send (CTS) signals from the one or more additional wireless nodes.

5. The method of claim 1, further comprising:
determining that a request-to-send (RTS) or clear-to-send (CTS) is being transmitted by at least one of the one or more additional wireless nodes; and
refraining from transmitting a second message in a direction corresponding to the at least one of the one or more additional wireless nodes based at least in part on the determination.

6. The method of claim 1, further comprising:
determining respective locations of the one or more additional wireless nodes based on the prior signaling.

7. The method of claim 1, further comprising:
receiving an indication of respective locations of the one or more additional wireless nodes, wherein selecting the plurality of reception directions is based at least in part on the indication.

8. The method of claim 1, wherein listening for the one or more signals comprises:
listening in a plurality of reception directions during respective time intervals; and
receiving the one or more signals during the respective time intervals.

9. The method of claim 1, further comprising:
receiving, from the one or more additional wireless nodes, an indication of a transmission configuration indicator (TCI) for at least one reference signal transmitted by the one or more additional wireless nodes, wherein selecting a plurality of reception directions is based at least in part on the indication.

10. The method of claim 1, further comprising:
receiving, prior to listening for the one or more signals from the one or more additional wireless nodes, a sequence or a message transmitted by the one or more additional wireless nodes.

11. The method of claim 10, wherein the sequence or the message conveys at least a cell identity of the one or more additional wireless nodes, a timing reference of the one or more additional wireless nodes, or any combination thereof.

12. The method of claim 1, wherein the sweeping receive pattern comprises a plurality of receive directions having a predefined angular separation between each of the plurality of receive directions.

13. The method of claim 12, wherein the plurality of receive directions are different than a direction corresponding to transmission of the first message to the second wireless node.

14. An apparatus for wireless communication a first wireless node, comprising:
means for selecting a plurality of reception directions for a sweeping receive pattern based at least in part on prior signaling transmitted by one or more additional wireless nodes;
means for transmitting a first message to a second wireless node; and
means for listening, while concurrently transmitting the first message and in accordance with the selected plurality of reception directions for the sweeping receive pattern, for one or more signals from the one or more additional wireless nodes in a direction corresponding to the selected plurality of reception directions.

15. The apparatus of claim 14, further comprising:
means for performing full-duplex communications.

16. The apparatus of claim 14, further comprising:
means for transmitting the first message and receiving the one or more signals in a same radio frequency band.

17. The apparatus of claim 14, wherein listening for the one or more signals comprises: listening for one or more request-to-send (RTS) and clear-to-send (CTS) signals from the one or more additional wireless nodes.

18. The apparatus of claim 14, further comprising:
means for determining that a request-to-send (RTS) or clear-to-send (CTS) is being transmitted by at least one of the one or more additional wireless nodes; and
means for refraining from transmitting a second message in a direction corresponding to the at least one of the one or more additional wireless nodes based at least in part on the determination.

19. An apparatus for wireless communication a first wireless node, comprising:
a processor;
memory in electronic communication with the processor; and
instructions stored in the memory and operable, when executed by the processor, to cause the apparatus to:
select a plurality of reception directions for a sweeping receive pattern based at least in part on prior signaling transmitted by one or more additional wireless nodes;
transmit a first message to a second wireless node; and
listen, while concurrently transmitting the first message and in accordance with the selected plurality of reception directions for the sweeping receive pattern, for one or more signals from the one or more additional wireless nodes in a direction corresponding to the selected plurality of reception directions.

20. The apparatus of claim 19, wherein the instructions are executable by the processor to:
perform full-duplex communications.

21. The apparatus of claim 19, wherein the instructions are executable by the processor to:
transmit the first message and receive the one or more signals in a same radio frequency band.

22. The apparatus of claim 19, wherein the instructions executable by the processor to cause the apparatus to listen for the one or more signals comprise instructions executable by the processor to cause the apparatus to:
listen for one or more request-to-send (RTS) and clear-to-send (CTS) signals from the one or more additional wireless nodes.

23. The apparatus of claim 19, wherein the instructions are executable by the processor to:
determine that a request-to-send (RTS) or clear-to-send (CTS) is being transmitted by at least one of the one or more additional wireless nodes; and
refrain from transmitting a second message in a direction corresponding to the at least one of the one or more additional wireless nodes based at least in part on the determination.

24. The apparatus of claim 19, wherein the instructions are executable by the processor to:
determine respective locations of the one or more additional wireless nodes based on the prior signaling.

25. The apparatus of claim 19, wherein the instructions are executable by the processor to:
receive an indication of respective locations of the one or more additional wireless nodes, wherein selecting the plurality of reception directions is based at least in part on the indication.

26. The apparatus of claim 19, wherein the instructions executable by the processor to cause the apparatus to listen for the one or more signals comprise instructions executable by the processor to cause the apparatus to:

listen in a plurality of reception directions during respective time intervals; and receive the one or more signals during the respective time intervals.

27. The apparatus of claim 19, wherein the instructions are executable by the processor to:

receive, from the one or more additional wireless nodes, an indication of a transmission configuration indicator (TCI) for at least one reference signal transmitted by the one or more additional wireless nodes, wherein selecting a plurality of reception directions is based at least in part on the indication.

28. The apparatus of claim 19, wherein the instructions are executable by the processor to:

receive, prior to listening for the one or more signals from the one or more additional wireless nodes, a sequence or a message transmitted by the one or more additional wireless nodes, wherein the sequence or the message conveys at least a cell identity of the one or more additional wireless nodes, a timing reference of the one or more additional wireless nodes, or any combination thereof.

29. The apparatus of claim 19, wherein the sweeping receive pattern comprises a plurality of receive directions having a predefined angular separation between each of the plurality of receive directions.

30. A non-transitory computer readable medium storing code for wireless communication a first wireless node, the code comprising instructions executable by a processor to:

select a plurality of reception directions for a sweeping receive pattern based at least in part on prior signaling transmitted by one or more additional wireless nodes;

transmit a first message to a second wireless node; and listen, while concurrently transmitting the first message and in accordance with the selected plurality of reception directions for the sweeping receive pattern, for one or more signals from the one or more additional wireless nodes in a direction corresponding to the selected plurality of reception directions.

* * * * *